US012568476B2

(12) United States Patent
Zhong et al.

(10) Patent No.: US 12,568,476 B2
(45) Date of Patent: Mar. 3, 2026

(54) CONFIGURATION OF RESOURCE SLOTS AND SERVICES IN COMMUNICATION CHANNELS

(71) Applicant: Huawei Technologies Co., Ltd., Shenzhen (CN)

(72) Inventors: Qiwen Zhong, Shenzhen (CN); Li Xu, Shenzhen (CN); Rixin Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 18/173,907

(22) Filed: Feb. 24, 2023

(65) Prior Publication Data

US 2023/0209517 A1 Jun. 29, 2023

Related U.S. Application Data

(63) Continuation of application No. PCT/CN2021/109787, filed on Jul. 30, 2021.

(30) Foreign Application Priority Data

Aug. 24, 2020 (CN) .......................... 202010857853.2

(51) Int. Cl.
*H04W 72/0446* (2023.01)

(52) U.S. Cl.
CPC ............................... *H04W 72/0446* (2013.01)

(58) Field of Classification Search
CPC ........... H04J 2203/0085; H04J 3/1658; H04W 24/02; H04W 72/0446; H04W 72/51
See application file for complete search history.

(56) References Cited

U.S. PATENT DOCUMENTS

| 2016/0212729 | A1* | 7/2016 | Bulten | H04W 72/51 |
| 2017/0005742 | A1* | 1/2017 | Gareau | H04J 3/1658 |
| 2018/0013511 | A1* | 1/2018 | Hussain | H04J 14/0205 |
| 2018/0145928 | A1* | 5/2018 | Zhong | H04L 47/783 |

(Continued)

FOREIGN PATENT DOCUMENTS

| CN | 106357421 A | 1/2017 |
| CN | 109729588 A | 5/2019 |

(Continued)

OTHER PUBLICATIONS

English translation of International Search Report (ISR) PCT/CN2021/109787; mailed Sep. 15, 2021 (Year: 2021).*

(Continued)

*Primary Examiner* — Benjamin H Elliott, IV

(74) *Attorney, Agent, or Firm* — Conley Rose, P.C.

(57) ABSTRACT

A first node communicates with a second node by using a first channel, and the first channel includes N slots. The first node sends first information to the second node, where the first information is used to request to change a correspondence between a first slot in the first channel and a first service, and where the first information includes an identifier of the first service and an identifier of the first slot. The first node receives second information from the second node, where the second information is used to indicate to acknowledge or reject the request in the first information.

20 Claims, 30 Drawing Sheets

(56) References Cited

U.S. PATENT DOCUMENTS

| | | | | |
|---|---|---|---|---|
| 2020/0259580 | A1* | 8/2020 | Zhong | H04J 3/16 |
| 2023/0209517 | A1* | 6/2023 | Zhong | H04W 72/0446 |
| | | | | 370/336 |

FOREIGN PATENT DOCUMENTS

| | | | | |
|---|---|---|---|---|
| EP | 2811796 A1 | 12/2014 | | |
| EP | 3313034 A1 | 4/2018 | | |
| WO | WO-2019085816 A1 * | 5/2019 | | H04W 72/04 |

OTHER PUBLICATIONS

Jean-Michel Caia, et al., "Considerations on hitless adjustment of OSU bandwidth," SG15-C2025, ITU-T Draft; Study Period 2017-2020; Study Group 15; Series C2025, International Telecommunication Union, Geneva ; CH vol. 11/15, Aug. 22, 2020, pp. 1-7, XP044297543.

* cited by examiner

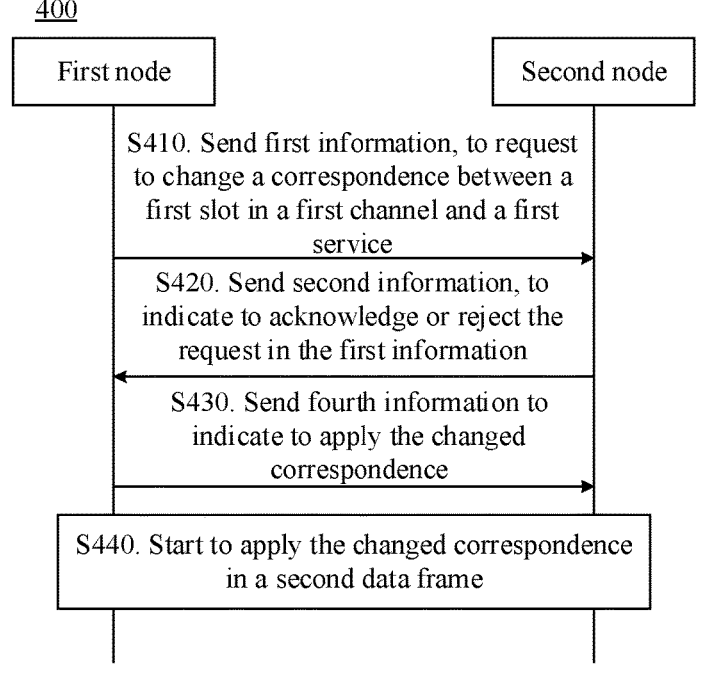

400

| First node | | Second node |

S410. Send first information, to request to change a correspondence between a first slot in a first channel and a first service S420. Send second information, to indicate to acknowledge or reject the request in the first information S430. Send fourth information to indicate to apply the changed correspondence S440. Start to apply the changed correspondence in a second data frame

FIG. 4

First information:

| Information type | Operation type | Identifier of a first service | Identifier of a first slot |

FIG. 5

| Information type | RES | Operation type | RES | Another field |

FIG. 6

| Information type (2 bits) | RES (1 bit) | Operation type (3 bits) | RES (1 bit) | Slot identifier (12 bits) | Service identifier (12 bits) | RES (9 bits) | CRC (7 bits) |
|---|---|---|---|---|---|---|---|
| 00 | 0 | 1000 | 0 | 110001001000 | 001011001000 | 000000000 | 1101000 |

First information:

FIG. 7

| Information type | RES | REQ | ACK | NACK | CMT | RES | Another field |
|---|---|---|---|---|---|---|---|

FIG. 8

| First information: | Information type (2 bits) | RES (1 bit) | REQ (1 bit) | ACK (1 bit) | NACK (1 bit) | CMT (1 bit) | RES (1 bit) | Slot identifier (12 bits) | Service identifier (12 bits) | RES (9 bits) | CRC (7 bits) |
|---|---|---|---|---|---|---|---|---|---|---|---|
|  | 00 | 0 | 1 | 0 | 0 | 0 | 0 | 110001001000 | 001011001000 | 000000000 | 1101000 |

FIG. 9

Second information:

| Information type (2 bits) | Operation type (2 bits) | Another field |
|---|---|---|
| 00 | 10 | ... |

(a)

Second information:

| Information type (2 bits) | Operation type (2 bits) | Another field |
|---|---|---|
| 00 | 11 | ... |

(b)

Second information:

| Information type (2 bits) | REQ (1 bit) | ACK (1 bit) | NACK (1 bit) | CMT (1 bit) | Operation type (3 bits) | Another field |
|---|---|---|---|---|---|---|
| 00 | 0 | 1 | 0 | 0 | 1000 | ... |

(c)

Second information:

| Information type (2 bits) | REQ (1 bit) | ACK (1 bit) | NACK (1 bit) | CMT (1 bit) | Operation type (3 bits) | Another field |
|---|---|---|---|---|---|---|
| 00 | 0 | 0 | 1 | 0 | 1000 | ... |

| Second information: | Information type (2 bits) | RES (1 bit) | Operation type (4 bits) | RES (1 bit) | Slot identifier (12 bits) | Service identifier (12 bits) | RES (9 bits) | CRC (7 bits) |
|---|---|---|---|---|---|---|---|---|
| | 00 | 0 | 0100 | 0 | 110001001000 | 001011001000 | 000000000 | 1001010 |

(a)

| Second information: | Information type (2 bits) | RES (1 bit) | REQ (1 bit) | ACK (1 bit) | NACK (1 bit) | CMT (1 bit) | RES (1 bit) | Slot identifier (12 bits) | Service identifier (12 bits) | RES (9 bits) | CRC (7 bits) |
|---|---|---|---|---|---|---|---|---|---|---|---|
| | 00 | 0 | 0 | 0 | 1 | 0 | 0 | 110001001000 | 001011001000 | 000000000 | 1001010 |

Figure 12:
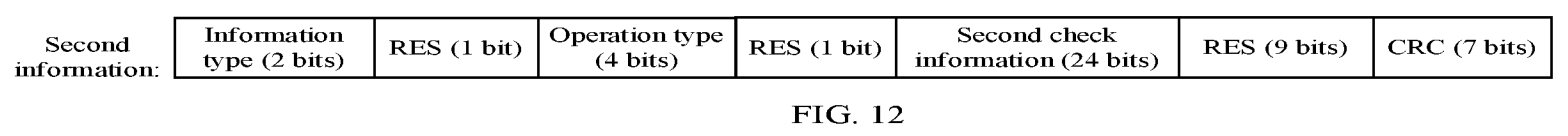

Second information:

| Information type (2 bits) | RES (1 bit) | Operation type (4 bits) | RES (1 bit) | Second check information (24 bits) | RES (9 bits) | CRC (7 bits) |
|---|---|---|---|---|---|---|

| | Information type (2 bits) | RES (1 bit) | Operation type (4 bits) | RES (1 bit) | Slot identifier (12 bits) | Service identifier (12 bits) | RES (9 bits) | CRC (7 bits) |
|---|---|---|---|---|---|---|---|---|
| Fourth information: | 00 | 0 | 0001 | 0 | 110001001000 | 001011001000 | 000000000 | 1100100 |

(b)

| | Information type (2 bits) | RES (1 bit) | Operation type (4 bits) | RES (1 bit) | First check information (24 bits) | RES (9 bits) | CRC (7 bits) |
|---|---|---|---|---|---|---|---|
| Fourth information: | 00 | 0 | 0001 | 0 | 0111 0010 0100 0110 0010 01000 | 000000000 | 1100100 |

FIG. 13

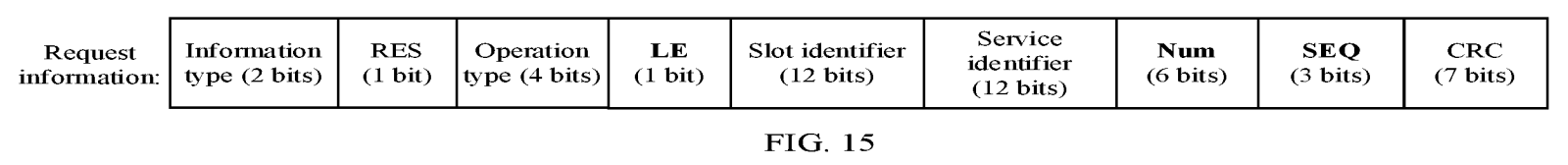

Request information:

| Information type (2 bits) | RES (1 bit) | Operation type (4 bits) | LE (1 bit) | Slot identifier (12 bits) | Service identifier (12 bits) | Num (6 bits) | SEQ (3 bits) | CRC (7 bits) |
|---|---|---|---|---|---|---|---|---|

FIG. 15

Request information 1:

| Information type (2 bits) | RES (1 bit) | Operation type (4 bits) | LE (1 bit) | Slot identifier (12 bits) | Service identifier (12 bits) | Num (6 bits) | SEQ (3 bits) | CRC (7 bits) |
|---|---|---|---|---|---|---|---|---|
| 00 | 0 | 1000 | 0 | 010001001000 | 001011001000 | 010000 | 010 | 1001010 |

Request information 2:

| Information type (2 bits) | RES (1 bit) | Operation type (4 bits) | LE (1 bit) | Slot identifier (12 bits) | Service identifier (12 bits) | Num (6 bits) | SEQ (3 bits) | CRC (7 bits) |
|---|---|---|---|---|---|---|---|---|
| 00 | 0 | 1000 | 1 | 110001001000 | 001011001000 | 010000 | 010 | 1001010 |

FIG. 16

| Information type (2 bits) | RES (1 bit) | Operation type (4 bits) | LE (1 bit) | First check information (24 bits) | Num (6 bits) | SEQ (3 bits) | CRC (7 bits) |
|---|---|---|---|---|---|---|---|
| 00 | 0 | 1000 | 1 | 0111 0010 0100 0110 0010 01000 | 010000 | 010 | 1001010 |

Request information 3:

FIG. 17

Response information:

| Information type (2 bits) | RES (1 bit) | Operation type (4 bits) | LE (1 bit) | Slot identifier (12 bits) | Service identifier (12 bits) | Num (6 bits) | SEQ (3 bits) | CRC (7 bits) |
|---|---|---|---|---|---|---|---|---|
| 00 | 0 | 0100 | 0 | 110001001000 | 001011001000 | 010000 | 010 | 1001010 |

(a)

Response information:

| Information type (2 bits) | RES (1 bit) | Operation type (4 bits) | LE (1 bit) | Second check information (24 bits) | Num (6 bits) | SEQ (3 bits) | CRC (7 bits) |
|---|---|---|---|---|---|---|---|
| 00 | 0 | 0100 | 0 | 0111 0010 0100 0110 0010 01000 | 010000 | 010 | 1001010 |

Check request information:

| Information type (2 bits) | RES (1 bit) | Operation type (4 bits) | LE (1 bit) | First check information (24 bits) | RES (6 bits) | SEQ (3 bits) | CRC (7 bits) |
|---|---|---|---|---|---|---|---|
| 00 | 0 | 1111 | 1 | 0111 0010 0100 0110 0010 01000 | 000000 | 010 | 1001010 |

(a)

Check response information:

| Information type (2 bits) | RES (1 bit) | Operation type (4 bits) | LE (1 bit) | Second check information (24 bits) | RES (6 bits) | SEQ (3 bits) | CRC (7 bits) |
|---|---|---|---|---|---|---|---|
| 00 | 0 | 1110 | 1 | 0111 0010 0100 0110 0010 01000 | 000000 | 010 | 1001010 |

First information:

| Information type (2 bits) | RES (1 bit) | Operation type (4 bits) | LE (1 bit) | Service identifier (12 bits) | Slot quantity (12 bits) | Num (6 bits) | SEQ (3 bits) | CRC (7 bits) |
|---|---|---|---|---|---|---|---|---|
| 00 | 0 | 1000 | 0 | 110001001000 | 110000000000 | 11000 | 010 | 1101000 |

(a)

First information:

| Information type (2 bits) | RES (1 bit) | REQ (1 bit) | ACK (1 bit) | NACK (1 bit) | CMT (1 bit) | LE (1 bit) | Service identifier (12 bits) | Slot quantity (12 bits) | Num (6 bits) | SEQ (3 bits) | CRC (7 bits) |
|---|---|---|---|---|---|---|---|---|---|---|---|
| 00 | 0 | 1 | 0 | 0 | 0 | 0 | 110001001000 | 110000000000 | 11000 | 010 | 1101000 |

Response information:

| Information type (2 bits) | RES (1 bit) | Operation type (4 bits) | LE (1 bit) | Service identifier (12 bits) | Slot identifier (12 bits) | Num (6 bits) | SEQ (3 bits) | CRC (7 bits) |
|---|---|---|---|---|---|---|---|---|
| 00 | 0 | 0100 | 0 | 001011001000 | 110001001000 | 110000 | 010 | 1001010 |

FIG. 23

Response information:

| Information type (2 bits) | RES (1 bit) | Operation type (4 bits) | LE (1 bit) | Service identifier (12 bits) | Slot identifier (12 bits) | Num (6 bits) | SEQ (3 bits) | CRC (7 bits) |
|---|---|---|---|---|---|---|---|---|
| 00 | 0 | 0100 | 1 | 001011001000 | 001001001000 | 110000 | 010 | 1001010 |

(a)

Response information:

| Information type (2 bits) | RES (1 bit) | Operation type (4 bits) | LE (1 bit) | Second check information (24 bits) | Num (6 bits) | SEQ (3 bits) | CRC (7 bits) |
|---|---|---|---|---|---|---|---|
| 00 | 0 | 0100 | 1 | 0111 0010 0100 0110 0010 01000 | 110000 | 010 | 1001010 |

Figure 26:
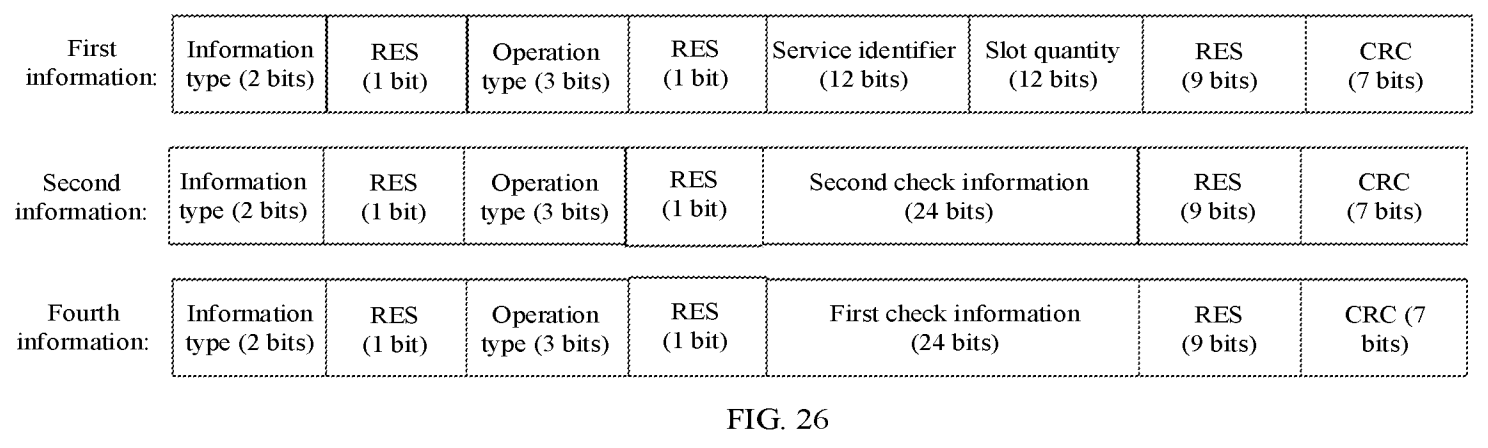

First information:

| Information type (2 bits) | RES (1 bit) | Operation type (3 bits) | RES (1 bit) | Service identifier (12 bits) | Slot quantity (12 bits) | RES (9 bits) | CRC (7 bits) |

Second information:

| Information type (2 bits) | RES (1 bit) | Operation type (3 bits) | RES (1 bit) | Second check information (24 bits) | RES (9 bits) | CRC (7 bits) |

Fourth information:

| Information type (2 bits) | RES (1 bit) | Operation type (3 bits) | RES (1 bit) | First check information (24 bits) | RES (9 bits) | CRC (7 bits) |

2800

First information:

| Information type (2 bits) | RES (1 bit) | Operation type (4 bits) | LE (1 bit) | Slot identifier (12 bits) | Service identifier (12 bits) | RES (6 bits) | SEQ (3 bits) | CRC (7 bits) |
|---|---|---|---|---|---|---|---|---|
| 00 | 0 | 1111 | 1 | 010000000000 | 001000000000 | 000000 | 010 | 1001010 |

(a)

First information:

| Information type (2 bits) | RES (1 bit) | Operation type (4 bits) | LE (1 bit) | Slot identifier (12 bits) | Service identifier (12 bits) | Num (6 bits) | SEQ (3 bits) | CRC (7 bits) |
|---|---|---|---|---|---|---|---|---|
| 00 | 0 | 1111 | 0 | 001000000000 | 001000000000 | 110000 | 010 | 1001010 |

Second information (a):

| Information type (2 bits) | RES (1 bit) | Operation type (4 bits) | LE (1 bit) | Slot identifier (12 bits) | Service identifier (12 bits) | RES (6 bits) | SEQ (3 bits) | CRC (7 bits) |
|---|---|---|---|---|---|---|---|---|
| 00 | 0 | 1111 | 1 | 100100000000 | 001000000000 | 000000 | 010 | 1001010 |

(a)

Second information (b):

| Information type (2 bits) | RES (1 bit) | Operation type (4 bits) | LE (1 bit) | Slot identifier (12 bits) | Service identifier (12 bits) | Num (6 bits) | SEQ (3 bits) | CRC (7 bits) |
|---|---|---|---|---|---|---|---|---|
| 00 | 0 | 1111 | 0 | 100100000000 | 001000000000 | 110000 | 010 | 1001010 |

CONFIGURATION OF RESOURCE SLOTS AND SERVICES IN COMMUNICATION CHANNELS

CROSS-REFERENCE TO RELATED APPLICATIONS

This is a continuation of International Patent Application No. PCT/CN2021/109787 filed on Jul. 30, 2021, which claims priority to Chinese Patent Application No. 202010857853.2 filed on Aug. 24, 2020. The disclosures of the aforementioned applications are hereby incorporated by reference in their entireties.

TECHNICAL FIELD

This disclosure relates to the communication field, and more specifically, to a resource configuration method and a communication apparatus.

BACKGROUND

A fifth-generation (5G) communication system enables thousands of industries. With the arrival of the post-5G era, a business private line requirement increases rapidly. A business private line bearing becomes a strategic focus of a metro transport bearing, and also becomes a service development focus of a telecommunication operator. A Metro Transport Network (MTN) technology and an Optical Transport Network (OTN) technology become urgent for the research of an efficient bearing solution to a business private line whose bandwidth is small and needs to be flexibly adjusted at any time. How to flexibly configure massive transmission resources of a business private line with a small-granularity bandwidth is a current research focus of a bearing transport network.

SUMMARY

This disclosure provides a resource configuration method and a communication apparatus, to improve resource configuration efficiency, and ensure service continuity.

According to a first aspect, a resource configuration method is provided, where the method may be performed by a first node or a module (such as a chip) configured in (or used in) the first node. The following is described by using an example in which the method is performed by the first node.

The first node communicates with a second node by using a first channel, and the first channel includes N slots. The method includes: the first node sends first information to the second node, where the first information is used to request to change a correspondence between a first slot in the first channel and a first service, and the first information includes an identifier of the first service and an identifier of the first slot; and the first node receives second information from the second node, where the second information is used to indicate to acknowledge or reject the request in the first information.

Based on the foregoing solution, in a massive slot scenario, for a scenario in which a service corresponds to a specified slot, the slot corresponding to the service can be dynamically adjusted, to implement on-demand dynamic hitless adjustment of a service bandwidth, and improve resource utilization.

With reference to the first aspect, in some implementations of the first aspect, before the correspondence is changed, if a slot corresponding to the first service includes the first slot, the first information is used to request to release the correspondence between the first service and the first slot; or before the correspondence is changed, if a slot corresponding to the first service does not include the first slot, the first information is used to request to establish the correspondence between the first service and the first slot.

Based on the foregoing solution, based on whether the slot corresponding to the first service includes the first slot, the first information implicitly indicates whether to add the first slot to or reduce the first slot from the slot corresponding to the first service, so that signaling overheads can be reduced.

With reference to the first aspect, in some implementations of the first aspect, the first information includes a first field, and the first field is used to indicate that the first information requests to release or establish the correspondence between the first service and the first slot.

Based on the foregoing solution, the first field in the first information indicates that the first information requests to establish or release a correspondence between a service and a slot, so that a slot corresponding to a service can be dynamically adjusted, to implement on-demand dynamic hitless adjustment of a service bandwidth, and improve resource utilization.

With reference to the first aspect, in some implementations of the first aspect, the first information further includes an identifier of a first task, the first task is used to change a correspondence between at least one slot in the first channel and a service, and the first information is one of at least one piece of request information corresponding to the first task.

Based on the foregoing solution, a slot configuration process to which an operation of requesting, by the first information, to change a service corresponding to a slot belongs is determined, so that the first task can process services corresponding to a plurality of slots, to implement a process of configuring slots in batches.

With reference to the first aspect, in some implementations of the first aspect, the first information includes a second field used to indicate whether the first information is the last piece of request information corresponding to the first task.

Based on the foregoing solution, the second field is used to indicate whether the request information is the last piece of request information in one or more pieces of request information corresponding to the first task.

With reference to the first aspect, in some implementations of the first aspect, that the first node receives second information from the second node includes: when the first information is the last piece of request information corresponding to the first task, the first node receives the second information from the second node.

Based on the foregoing solution, the second field is used to indicate whether the request information is the last piece of request information in one or more pieces of request information corresponding to the first task. In this way, after determining that the last piece of request information corresponding to the first task is received, the second node sends response information (namely, the second information). In addition, after the first node completes sending the request information corresponding to the first task, the second node feeds back the response information. This avoids resource occupation caused by a plurality of times of sending the response information by the second node, and improves communication efficiency.

With reference to the first aspect, in some implementations of the first aspect, when the first information is not the last piece of request information corresponding to the first task, that the first node receives second information from the second node includes: after the first node sends third information to the second node, the first node receives the second information from the second node, where the third information includes a second field used to indicate that the third information is the last piece of request information corresponding to the first task, the third information further includes first check information, and the first check information is generated by the first node based on service information that corresponds to a slot in the first channel and that exists after the correspondence is changed.

With reference to the first aspect, in some implementations of the first aspect, the second information includes the identifier of the first task.

Based on the foregoing solution, the second information includes the identifier of the first task, so that the first node determines, based on the identifier of the first task, that the second information is response information of the first task, to improve communication reliability.

With reference to the first aspect, in some implementations of the first aspect, the first information and/or the second information further include/includes a quantity of correspondences that are between a slot and a service and that are to be changed in the first task.

Based on the foregoing solution, the first node and the second node exchange the quantity of correspondences that are between a slot and a service and that are to be changed in the first task, so that a consensus is reached between nodes about a quantity of slots that need to be configured in the first task. The second node may determine, based on the quantity, whether the request information from the first node is totally received, to determine whether to send the response information.

With reference to the first aspect, in some implementations of the first aspect, the second information further includes the identifier of the first service and/or the identifier of the first slot.

Based on the foregoing solution, the second information includes the identifier of the first service and/or the identifier of the first slot, so that the first node and the second node determine a slot and a service between which a correspondence needs to be changed, to further improve slot configuration reliability.

With reference to the first aspect, in some implementations of the first aspect, the second information includes second check information, and the second check information is check information generated by the second node based on service information that corresponds to a slot in the first channel and that exists after the correspondence is changed.

Based on the foregoing solution, the second information includes the second check information, so that the first node determines, based on check information of the first node, whether slot configurations between the first node and the second node are consistent, to reduce a probability of a configuration error, and improve communication reliability.

With reference to the first aspect, in some implementations of the first aspect, the first channel includes a data frame, the data frame includes an overhead and a payload, and the payload includes the N slots.

With reference to the first aspect, in some implementations of the first aspect, one data frame includes M basic frames, each basic frame includes a sub-overhead and a sub-payload, the sub-payload includes L slots, and the N slots are a set of sub-payloads in the M basic frames.

With reference to the first aspect, in some implementations of the first aspect, the first information is carried in a sub-overhead in a first basic frame in a first data frame, the first slot is a slot of a sub-payload in a second basic frame, the second basic frame is a basic frame in a second data frame, the second data frame is later than the first data frame in terms of time, and a location of the first basic frame in the first data frame is different from a location of the second basic frame in the second data frame.

Based on the foregoing solution, the first node negotiates with the second node by using the first information to change a slot configuration in a to-be-sent data frame, and uses the negotiated slot configuration when a consensus is reached through negotiation, to avoid a service transmission error caused because the negotiated exchange information is not successfully received.

With reference to the first aspect, in some implementations of the first aspect, the method further includes: the first node sends fourth information to the second node, where the fourth information is used to indicate to apply the changed correspondence.

Based on the foregoing solution, after the first node and the second node directly reach a consensus about the changed correspondence, the first node notifies, by using fourth information, the second node to apply the changed correspondence, so that communication reliability can be improved.

With reference to the first aspect, in some implementations of the first aspect, the fourth information is carried in one or more basic frames in a third data frame sent by the first node, the fourth information is used to indicate to apply the changed correspondence in the second data frame, the second data frame is later than the third data frame in terms of time, and the third data frame and the second data frame are data frames in the first channel.

Based on the foregoing solution, the fourth information is used to notify the second node of a start data frame in which the changed correspondence is applied, so that the first node and the second node reach a consensus about a data frame in which the changed correspondence is applied, to avoid a communication failure or a service loss caused because slot configurations applied by the first node and the second node are not consistent, so that communication correctness and reliability can be improved.

With reference to the first aspect, in some implementations of the first aspect, the fourth information includes one or more pieces of the following information: the identifier of the first service; the identifier of the first slot; the second check information, where the second check information is check information generated by the first node based on service information that corresponds to a slot in the first channel and that exists after the correspondence is changed; the identifier of the first task, where the first information is one of the at least one piece of request information corresponding to the first task, and the first task is used to change a service corresponding to at least one slot in a data unit; and the quantity of correspondences that are between a slot and a task and that are to be changed in the first task.

With reference to the first aspect, in some implementations of the first aspect, each sub-overhead includes a signaling type field. When the signaling type field indicates a first value, it indicates that the sub-overhead is used to carry related information for changing a correspondence between a slot and a service, and the related information includes at least one of the first information, the second information, and the fourth information.

With reference to the first aspect, in some implementations of the first aspect, when the signaling type field in the sub-overhead indicates the first value, the sub-overhead further includes an operation indication field, and the operation indication field includes at least one of the following indication manners: when the operation indication field indicates a second value, it indicates that the sub-overhead is the first information; when the operation indication field indicates a third value, it indicates that the sub-overhead is the second information, and the second information indicates to acknowledge the request in the first information; when the operation indication field indicates a fourth value, it indicates that the sub-overhead is the second information, and the second information indicates to reject the request in the first information; and when the operation indication field indicates a fifth value, it indicates that the sub-overhead is the third information.

With reference to the first aspect, in some implementations of the first aspect, the method further includes:

The first node receives request information from a third node, to request to change the correspondence between the first slot and the first service; and when the first information of the third node indicates to release the correspondence between the first service and the first slot, after receiving the second information from the second node, the first node sends response information to the third node, to indicate acknowledge or reject the request in the request information; or when the first information of the third node indicates to establish the correspondence between the first service and the first slot, before sending the first information to the second node, the first node sends the response information to the third node.

Based on the foregoing solution, when a service bandwidth needs to be increased, request information is first transmitted hop by hop or end-to-end, to first increase a downstream bandwidth of a node, and then increase an upstream bandwidth of the node. In this way, the following case can be avoided: because the downstream bandwidth of the node is less than the upstream bandwidth, data that arrives due to the large upstream bandwidth cannot be sent in a timely manner due to a limitation of the downstream bandwidth, and consequently the data is accumulated on the node, causing a delay or even a data loss due to buffer overflow.

With reference to the first aspect, in some implementations of the first aspect, that the first node sends first information to the second node includes: the first node receives fifth information from a management device, where the fifth information is used to indicate to change a slot that corresponds to the first service and that is in the first channel; and the first node sends the first information to the second node based on the fifth information.

With reference to the first aspect, in some implementations of the first aspect, that the first node sends first information to the second node includes: the first node receives sixth information from the second node, where the sixth information is used to indicate to change a slot that corresponds to the first service and that is in the first channel; and the first node sends the first information to the second node based on the sixth information.

Based on the foregoing solution, when a service bandwidth needs to be increased, a network management device notifies a downstream node, so that the downstream node and an adjacent upstream node first complete increasing the bandwidth, and then the downstream node notifies the upstream node to start a slot configuration process of increasing the bandwidth. This can avoid a case in which data is lost due to data accumulation or even buffer overflow because an upstream bandwidth of an intermediate node is greater than a downstream bandwidth.

With reference to the first aspect, in some implementations of the first aspect, the first node requests, based on a delay optimization requirement, to change the correspondence between the first service and the first slot.

Based on the foregoing solution, service delay optimization can be implemented, and a case in which a service delay is increased due to internal processing, a frequency deviation, and the like of a node can be reduced.

According to a second aspect, a resource configuration method is provided, where the method may be performed by a second node or a module (such as a chip) configured in (or used in) the second node. The following is described by using an example in which the method is performed by the second node.

The method includes: a first node communicates with the second node by using a first channel, and the first channel includes N slots. The method includes: the second node receives first information from the first node, where the first information is used to request to change a correspondence between a first slot in the first channel and a first service, and the first information includes an identifier of the first service and an identifier of the first slot; and the second node sends second information to the first node, where the second information is used to indicate to acknowledge or reject the request in the first information.

With reference to the second aspect, in some implementations of the second aspect, before the correspondence is changed, if a slot corresponding to the first service includes the first slot, the first information is used to request to release the correspondence between the first service and the first slot; or before the correspondence is changed, if a slot corresponding to the first service does not include the first slot, the first information is used to request to establish the correspondence between the first service and the first slot.

With reference to the second aspect, in some implementations of the second aspect, the first information includes a first field, and the first field is used to indicate that the first information requests to release or establish the correspondence between the first service and the first slot.

With reference to the second aspect, in some implementations of the second aspect, the first information further includes an identifier of a first task, the first task is used to change a correspondence between at least one slot in the first channel and a service, and the first information is one of at least one piece of request information corresponding to the first task.

With reference to the second aspect, in some implementations of the second aspect, the first information includes a second field used to indicate whether the first information is the last piece of request information corresponding to the first task.

With reference to the second aspect, in some implementations of the second aspect, that the second node sends second information to the first node includes: when the first information is the last piece of request information corresponding to the first task, the second node sends the second information to the first node.

With reference to the second aspect, in some implementations of the second aspect, when the first information is not the last piece of request information corresponding to the first task, that the second node sends second information to the first node includes: after the first node sends third information to the second node, the second node sends the second information to the first node, where the third information includes a second field used to indicate that the third information is the last piece of request information corresponding to the first task, the third information further includes first check information, and the first check information is generated by the first node based on service information that corresponds to a slot in the first channel and that exists after the correspondence is changed.

With reference to the second aspect, in some implementations of the second aspect, the second information includes the identifier of the first task.

With reference to the second aspect, in some implementations of the second aspect, the first information and/or the second information further include/includes a quantity of correspondences that are between a slot and a service and that are to be changed in the first task.

With reference to the second aspect, in some implementations of the second aspect, the second information further includes the identifier of the first service and/or the identifier of the first slot.

With reference to the second aspect, in some implementations of the second aspect, the second information includes second check information, and the second check information is check information generated by the second node based on service information that corresponds to a slot in the first channel and that exists after the correspondence is changed.

With reference to the second aspect, in some implementations of the second aspect, the first channel includes a data frame, the data frame includes an overhead and a payload, and the payload includes the N slots.

With reference to the second aspect, in some implementations of the second aspect, one data frame includes M basic frames, each basic frame includes a sub-overhead and a sub-payload, the sub-payload includes L slots, and the N slots are a set of sub-payloads in the M basic frames.

With reference to the second aspect, in some implementations of the second aspect, the first information is carried in a sub-overhead in a first basic frame in a first data frame, the first slot is a slot of a sub-payload in a second basic frame, the second basic frame is a basic frame in a second data frame, the second data frame is later than the first data frame in terms of time, and a location of the first basic frame in the first data frame is different from a location of the second basic frame in the second data frame.

With reference to the second aspect, in some implementations of the second aspect, the method further includes: the second node receives fourth information from the first node, where the fourth information is used to indicate to apply the changed correspondence.

With reference to the second aspect, in some implementations of the second aspect, the fourth information is carried in one or more basic frames in a third data frame sent by the first node, the fourth information is used to indicate to apply the changed correspondence in the second data frame, the second data frame is later than the third data frame in terms of time, and the third data frame and the second data frame are data frames in the first channel.

With reference to the second aspect, in some implementations of the second aspect, the fourth information includes one or more pieces of the following information: the identifier of the first service; the identifier of the first slot; the second check information, where the second check information is check information generated by the first node based on service information that corresponds to a slot in the first channel and that exists after the correspondence is changed; the identifier of the first task, where the first information is one of the at least one piece of request information corresponding to the first task, and the first task is used to change a service corresponding to at least one slot in a data unit; and the quantity of correspondences that are between a slot and a service and that are to be changed in the first task.

With reference to the second aspect, in some implementations of the second aspect, each sub-overhead includes a signaling type field. When the signaling type field indicates a first value, it indicates that the sub-overhead is used to carry related information for changing a correspondence between a slot and a service, and the related information includes at least one of the first information, the second information, and the fourth information.

With reference to the second aspect, in some implementations of the second aspect, when the signaling type field in the sub-overhead indicates the first value, the sub-overhead further includes an operation indication field, and the operation indication field includes at least one of the following indication manners: when the operation indication field indicates a second value, it indicates that the sub-overhead is the first information; when the operation indication field indicates a third value, it indicates that the sub-overhead is the second information, and the second information indicates to acknowledge the request in the first information; when the operation indication field indicates a fourth value, it indicates that the sub-overhead is the second information, and the second information indicates to reject the request in the first information; and when the operation indication field indicates a fifth value, it indicates that the sub-overhead is the third information.

With reference to the second aspect, in some implementations of the second aspect, the method further includes: when the first information indicates to establish the correspondence between the first service and the first slot, before sending the second information to the first node, the second node sends request information to a fourth node, to request to change the correspondence between the first service and the first slot; or when the first information indicates to release the correspondence between the first service and the first slot, after sending the second information to the first node, the second node sends the request information to the fourth node.

With reference to the second aspect, in some implementations of the second aspect, before the second node receives the first information from the first node, the method further includes: the second node receives seventh information from a management device, where the seventh information is used to indicate to change a slot that corresponds to the first service and that is in the first channel; and the second node sends sixth information to the first node, where the sixth information is used to indicate to change the slot that corresponds to the first service and that is in the first channel.

With reference to the second aspect, in some implementations of the second aspect, the method further includes: the second node determines, based on a delay optimization requirement, to release the correspondence between the first service and the first slot, and establishes a correspondence between the first service and a second slot, where the second information includes the identifier of the first service and an identifier of the second slot.

According to a third aspect, a resource configuration method is provided, where the method may be performed by a first node or a module (such as a chip) configured in (or used in) the first node. The following is described by using an example in which the method is performed by the first node.

The method includes: the first node communicates with a second node by using a first channel, and the first channel includes N slots. The method includes: the first node sends first information to the second node, where the first information is used to request to change a slot that corresponds to a first service and that is in the first channel, and the first information includes an identifier of the first service and a quantity of slots corresponding to the first service; and the first node receives second information from the second node, where the second information is used to indicate to acknowledge or reject the request in the first information.

With reference to the third aspect, in some implementations of the third aspect, the first channel includes a data frame, the data frame includes an overhead and a payload, and the payload includes the N slots.

With reference to the third aspect, in some implementations of the third aspect, one data frame includes M basic frames, each basic frame includes a sub-overhead and a sub-payload, the sub-payload includes L slots, and the N slots are a set of sub-payloads in the M basic frames.

With reference to the third aspect, in some implementations of the third aspect, the first information is carried in a sub-overhead in a first basic frame in a first data frame, a first slot is a slot of a sub-payload in a second basic frame, the second basic frame is a basic frame in a second data frame, the second data frame is later than the first data frame in terms of time, and a location of the first basic frame in the first data frame is different from a location of the second basic frame in the second data frame.

With reference to the third aspect, in some implementations of the third aspect, when the second information indicates to acknowledge the request in the first information, the second information is further used to indicate to change a correspondence between the first service and the first slot.

With reference to the third aspect, in some implementations of the third aspect, before the correspondence is changed, if a slot corresponding to the first service includes the first slot, the second information is used to indicate to release the correspondence between the first service and the first slot; or before the correspondence is changed, if a slot corresponding to the first service does not include the first slot, the second information is used to indicate to establish the correspondence between the first service and the first slot.

With reference to the third aspect, in some implementations of the third aspect, the second information includes a first field, and the first field is used to indicate that the second information indicates to release or establish the correspondence between the first service and the first slot.

With reference to the third aspect, in some implementations of the third aspect, the second information further includes an identifier of a first task, the first task is used to change a correspondence between at least one slot in the first channel and the first service, and the second information is one of at least one piece of response information corresponding to the first task.

With reference to the third aspect, in some implementations of the third aspect, the second information further includes a quantity of slots to be changed in the first task.

With reference to the third aspect, in some implementations of the third aspect, the second information includes a second field, and the second field is used to indicate whether the second information is the last piece of response information corresponding to the first task.

With reference to the third aspect, in some implementations of the third aspect, the method further includes:

When the second information is the last piece of response information corresponding to the first task, the first node sends third information to the second node, where the third information is used to indicate to apply the changed slot corresponding to the first service.

With reference to the third aspect, in some implementations of the third aspect, when the second field indicates that the second information is not the last piece of response information corresponding to the first task, after the first node receives fourth information from the second node, the first node sends third information to the second node, where the third information is used to indicate to apply the changed slot corresponding to the first service, the fourth information includes a second field used to indicate that the fourth information is the last piece of response information corresponding to the first task, the fourth information further includes second check information, and the second check information is generated by the second node based on service information that corresponds to a slot in the first channel and that exists after the correspondence is changed.

With reference to the third aspect, in some implementations of the third aspect, the third information further includes first check information, and the first check information is generated by the first node based on service information corresponding to a slot in the first channel.

With reference to the third aspect, in some implementations of the third aspect, the third information is carried in one or more basic frames in a third data frame sent by the first node, the third information is used to indicate to apply the changed correspondence in the second data frame, the second data frame is later than the third data frame in terms of time, and the third data frame and the second data frame are data frames in the first channel.

With reference to the third aspect, in some implementations of the third aspect, the method further includes:

The first node determines, based on the quantity of slots corresponding to the first service and a first algorithm, the slot that corresponds to the first service and that is in the first channel.

According to a fourth aspect, a resource configuration method is provided, where the method may be performed by a second node or a module (such as a chip) configured in (or used in) the second node. The following is described by using an example in which the method is performed by the second node.

The method includes: the second node receives first information from a first node, where the first information is used to request to change a slot that corresponds to a first service and that is in a first channel, and the first information includes an identifier of the first service and a quantity of slots corresponding to the first service; and the second node sends second information to the first node, where the second information is used to indicate to acknowledge or reject the request in the first information.

Based on the foregoing solution, in a massive slot scenario, for a scenario in which a service corresponds to a specified slot, slot configuration is performed by a downstream node, to help the downstream node determine to forward service data in a fastest manner, so as to reduce a delay of the node while a slot is correctly and reliably adjusted.

With reference to the fourth aspect, in some implementations of the fourth aspect, the first channel includes a data frame, the data frame includes an overhead and a payload, and the payload includes the N slots.

With reference to the fourth aspect, in some implementations of the fourth aspect, one data frame includes M basic frames, each basic frame includes a sub-overhead and a sub-payload, the sub-payload includes L slots, and the N slots are a set of sub-payloads in the M basic frames.

With reference to the fourth aspect, in some implementations of the fourth aspect, the first information is carried in a sub-overhead in a first basic frame in a first data frame, a first slot is a slot of a sub-payload in a second basic frame, the second basic frame is a basic frame in a second data frame, the second data frame is later than the first data frame in terms of time, and a location of the first basic frame in the first data frame is different from a location of the second basic frame in the second data frame.

With reference to the fourth aspect, in some implementations of the fourth aspect, when the second information indicates to acknowledge the request in the first information, the second information is further used to indicate to change a correspondence between the first service and the first slot.

With reference to the fourth aspect, in some implementations of the fourth aspect, before the correspondence is changed, if a slot corresponding to the first service includes the first slot, the second information is used to indicate to release the correspondence between the first service and the first slot; or before the correspondence is changed, if a slot corresponding to the first service does not include the first slot, the second information is used to indicate to establish the correspondence between the first service and the first slot.

With reference to the fourth aspect, in some implementations of the fourth aspect, the second information includes a first field, and the first field is used to indicate that the second information indicates to release or establish the correspondence between the first service and the first slot.

With reference to the fourth aspect, in some implementations of the fourth aspect, the second information further includes an identifier of a first task, the first task is used to change a correspondence between at least one slot in the first channel and the first service, and the second information is one of at least one piece of response information corresponding to the first task.

With reference to the fourth aspect, in some implementations of the fourth aspect, the second information further includes a quantity of slots to be changed in the first task.

With reference to the fourth aspect, in some implementations of the fourth aspect, the second information includes a second field, and the second field is used to indicate whether the second information is the last piece of response information corresponding to the first task.

With reference to the fourth aspect, in some implementations of the fourth aspect, the method further includes: when the second information is the last piece of response information corresponding to the first task, the second node receives third information from the first node, where the third information is used to indicate to apply the changed slot corresponding to the first service.

With reference to the fourth aspect, in some implementations of the fourth aspect, when the second field indicates that the second information is not the last piece of response information corresponding to the first task, after the second node sends fourth information to the first node, the second node receives third information from the first node, where the third information is used to indicate to apply the changed slot corresponding to the first service, the fourth information includes a second field used to indicate that the fourth information is the last piece of response information corresponding to the first task, the fourth information further includes second check information, and the second check information is generated by the second node based on service information that corresponds to a slot in the first channel and that exists after the correspondence is changed.

With reference to the fourth aspect, in some implementations of the fourth aspect, the third information further includes first check information, and the first check information is generated by the first node based on service information corresponding to a slot in the first channel.

With reference to the fourth aspect, in some implementations of the fourth aspect, the third information is carried in one or more basic frames in a third data frame sent by the first node, the third information is used to indicate to apply the changed correspondence in the second data frame, the second data frame is later than the third data frame in terms of time, and the third data frame and the second data frame are data frames in the first channel.

With reference to the fourth aspect, in some implementations of the fourth aspect, the method further includes: the second node determines, based on first reference information, the slot that corresponds to the first service and that is in the first channel, where the first reference information includes one or more of the following: the quantity of slots corresponding to the first service, a first algorithm, and the identifier of the first service.

With reference to the fourth aspect, in some implementations of the fourth aspect, the first reference information further includes one or more of the following: a slot configuration of a transmit channel of the second node and a slot configuration of a receive channel of the second node.

According to a fifth aspect, a resource configuration method is provided, where the method may be performed by a first node or a module (such as a chip) configured in (or used in) the first node. The following is described by using an example in which the method is performed by the first node.

The method includes: the first node communicates with a second node by using a first channel, and the first channel includes N slots. The method includes: the first node sends first information to the second node, where the first information includes first check information, and the first check information is generated by the first node based on service information corresponding to a slot in the first channel; and the first node receives second information from the second node, where the second information is used to indicate whether the first check information is consistent with second check information, and the second check information is generated by the second node based on service information corresponding to a slot in the first channel.

With reference to the fifth aspect, in some implementations of the fifth aspect, the second information includes the second check information.

With reference to the fifth aspect, in some implementations of the fifth aspect, that the first node sends first information to the second node includes: the first node periodically sends the first information to the second node.

According to a sixth aspect, a resource configuration method is provided, where the method may be performed by a second node or a module (such as a chip) configured in (or used in) the second node. The following is described by using an example in which the method is performed by the second node.

The method includes: a first node communicates with the second node by using a first channel, and the first channel includes N slots. The method includes: the second node receives first information from the first node, where the first information includes first check information, and the first check information is generated by the first node based on service information corresponding to a slot in the first channel; and the second node sends second information to the first node, where the second information is used to indicate whether the first check information is consistent with second check information, and the second check information is generated by the second node based on service information corresponding to a slot in the first channel.

Based on the foregoing solution, when a service bandwidth needs to be reduced, a bandwidth reduction process is first completed between two adjacent nodes, to reduce an upstream bandwidth of the node, and then reduce a downstream bandwidth of the node. Therefore, it can be ensured that the upstream bandwidth of the node is less than the downstream bandwidth, to avoid a case in which data is lost because data in a buffer is accumulated or overflows.

With reference to the sixth aspect, in some implementations of the sixth aspect, the second information includes the second check information.

With reference to the sixth aspect, in some implementations of the sixth aspect, the first information is periodic information.

According to a seventh aspect, a communication apparatus is provided, where the apparatus is configured in a first node or the apparatus is the first node, the first node communicates with a second node by using a first channel, and the first channel includes N slots.

The apparatus includes: a processing unit, configured to determine to change a correspondence between a first slot in the first channel and a first service; and a transceiver unit, configured to send first information to the second node, where the first information is used to request to change the correspondence between the first slot in the first channel and the first service, and the first information includes an identifier of the first service and an identifier of the first slot, where the transceiver unit is further configured to receive second information from the second node, where the second information is used to indicate to acknowledge or reject the request in the first information.

According to an eighth aspect, a communication apparatus is provided, where the apparatus is configured in a second node or the apparatus is the first node, the first node communicates with a second node by using a first channel, and the first channel includes N slots.

The apparatus includes: a processing unit, configured to determine to change a correspondence between a first slot in the first channel and a first service; and a transceiver unit, configured to receive first information from the first node, where the first information is used to request to change the correspondence between the first slot in the first channel and the first service, and the first information includes an identifier of the first service and an identifier of the first slot, where the transceiver unit is further configured to send second information to the first node, where the second information is used to indicate to acknowledge or reject the request in the first information.

According to a ninth aspect, a communication apparatus is provided, where the apparatus is configured in a second node or the apparatus is the second node, a first node communicates with the second node by using a first channel, and the first channel includes N slots.

The apparatus includes: a transceiver unit, configured to receive first information from the first node, where the first information is used to request to change a correspondence between a first slot in the first channel and a first service, and the first information includes an identifier of the first service and an identifier of the first slot; and a processing unit, configured to determine whether to acknowledge or reject the request in the first information, where the transceiver unit is further configured to send second information to the first node, where the second information is used to indicate to acknowledge or reject the request in the first information.

According to a tenth aspect, a communication apparatus is provided, where the apparatus is configured in a first node or the apparatus is the first node, the first node communicates with a second node by using a first channel, and the first channel includes N slots.

The apparatus includes: a processing unit, configured to determine to change a slot that corresponds to a first service and that is in the first channel; and a transceiver unit, configured to send first information to the second node, where the first information is used to request to change the slot that corresponds to the first service and that is in the first channel, and the first information includes an identifier of the first service and a quantity of slots corresponding to the first service, where the transceiver unit is further configured to receive second information from the second node, where the second information is used to indicate to acknowledge or reject the request in the first information.

According to an eleventh aspect, a communication apparatus is provided, where the apparatus is configured in a second node or the apparatus is the second node, a first node communicates with the second node by using a first channel, and the first channel includes N slots.

The apparatus includes: a transceiver unit, configured to receive first information from the first node, where the first information is used to request to change a slot that corresponds to a first service and that is in the first channel, and the first information includes an identifier of the first service and a quantity of slots corresponding to the first service; and a processing unit, configured to determine to acknowledge or reject the request in the first information, where the transceiver unit is further configured to send second information to the first node, where the second information is used to indicate to acknowledge or reject the request in the first information.

According to a twelfth aspect, a communication apparatus is provided, including a processor. The processor is coupled to a memory, and may be configured to execute instructions in the memory, to implement the method in any one of the first aspect, the third aspect, or the fifth aspect or the possible implementations of the first aspect, the third aspect, or the fifth aspect. Optionally, the communication apparatus further includes the memory. Optionally, the communication apparatus further includes a communication interface, and the processor is coupled to the communication interface.

In an implementation, the communication apparatus is a first node. When the communication apparatus is a first node, the communication interface may be a transceiver or an input/output interface.

In another implementation, the communication apparatus is a chip configured in the first node. When the communication apparatus is a chip configured in the first node, the communication interface may be an input/output interface.

Optionally, the transceiver may be a transceiver circuit. Optionally, the input/output interface may be an input/output circuit.

According to a thirteenth aspect, a communication apparatus is provided, and includes a processor. The processor is coupled to a memory, and may be configured to execute instructions in the memory, to implement the method in any one of the second aspect, the fourth aspect, or the sixth aspect or the possible implementations of the second aspect, the fourth aspect, or the sixth aspect. Optionally, the communication apparatus further includes the memory. Optionally, the communication apparatus further includes a communication interface, and the processor is coupled to the communication interface.

In an implementation, the communication apparatus is a second node. When the communication apparatus is a second node, the communication interface may be a transceiver or an input/output interface.

In another implementation, the communication apparatus is a chip configured in the second node. When the communication apparatus is a chip configured in the second node, the communication interface may be an input/output interface.

Optionally, the transceiver may be a transceiver circuit. Optionally, the input/output interface may be an input/output circuit.

According to a fourteenth aspect, a processor is provided, including an input circuit, an output circuit, and a processing circuit. The processing circuit is configured to: receive a signal by using the input circuit, and transmit a signal by using the output circuit, so that the processor performs the method in any one of the first aspect to the sixth aspect or the possible implementations of the first aspect to the sixth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this disclosure.

According to a fifteenth aspect, a processing apparatus is provided, including a processor and a memory. The processor is configured to: read instructions stored in the memory, receive a signal by using a receiver, and transmit a signal by using a transmitter, to perform the method in any one of the first aspect to the sixth aspect or the possible implementations of the first aspect to the sixth aspect.

Optionally, there are one or more processors, and there are one or more memories.

Optionally, the memory may be integrated into the processor, or the memory and the processor are separately disposed.

In a specific implementation process, the memory may be a non-transitory memory, for example, a read-only memory (ROM). The memory and the processor may be integrated into a same chip, or may be disposed on different chips. A type of the memory and a manner in which the memory and the processor are disposed are not limited in this embodiment of this disclosure.

It should be understood that, a related data exchange process such as sending of indication information may be a process of outputting the indication information from the processor, and receiving of capability information may be a process of receiving the input capability information by the processor. Data output by the processor may be output to a transmitter, and input data received by the processor may be from a receiver. The transmitter and the receiver may be collectively referred to as a transceiver.

The processing apparatus in the fifteenth aspect may be one or more chips. The processor in the processing apparatus may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor, and exists independently.

According to a sixteenth aspect, a computer program product is provided. The computer program product includes a computer program (which may also be referred to as code or instructions), and when the computer program is run, a computer is enabled to perform the method in any one of the first aspect to the sixth aspect or the possible implementations of the first aspect to the sixth aspect.

According to a seventeenth aspect, a computer-readable storage medium is provided.

The computer-readable storage medium stores a computer program (which may also be referred to as code or instructions), and when the computer program is run on a computer, the computer is enabled to perform the method in any one of the first aspect to the sixth aspect or the possible implementations of the first aspect to the sixth aspect.

According to an eighteenth aspect, a communication system is provided, including the foregoing first node and the foregoing second node.

BRIEF DESCRIPTION OF DRAWINGS

FIG. 4 is a schematic flowchart of a resource configuration method according to this disclosure.

FIG. 5 to FIG. 9 are schematic diagrams of first information according to an embodiment of this disclosure.

FIG. 10 to FIG. 12 are schematic diagrams of second information according to an embodiment of this disclosure.

FIG. 13 is a schematic diagram of fourth information according to an embodiment of this disclosure.

FIG. 15 to FIG. 17 are schematic diagrams of request information according to an embodiment of this disclosure.

FIG. 18 is a schematic diagram of response information according to an embodiment of this disclosure.

FIG. 19 is a schematic diagram of check request information and check response information according to an embodiment of this disclosure.

FIG. 22 is a schematic diagram of first information according to an embodiment of this disclosure.

FIG. 23 and FIG. 24 are schematic diagrams of response information according to an embodiment of this disclosure.

FIG. 26 is a schematic diagram of resource configuration related information according to an embodiment of this disclosure.

FIG. 29 is a schematic diagram of first information according to an embodiment of this disclosure.

FIG. 30 is a schematic diagram of second information according to an embodiment of this disclosure.

DESCRIPTION OF EMBODIMENTS

Figures 1, 2:
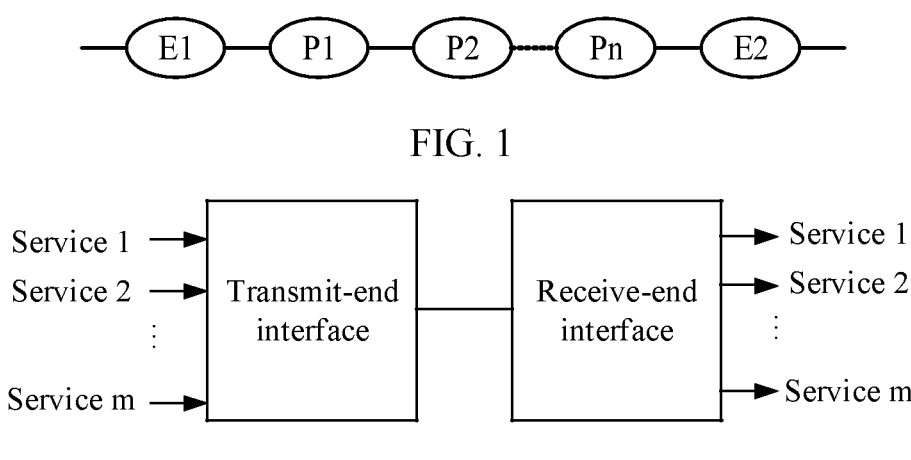
FIG. 1 is a schematic diagram of an architecture of a communication system applicable to an embodiment of this disclosure.
FIG. 2 is a schematic diagram of a communication interface of a transmission service applicable to an embodiment of this disclosure.

The following describes technical solutions of this disclosure with reference to the accompanying drawings.

The Flexible Ethernet (FlexE) is a lightweight enhanced Ethernet technology that supports port binding and time-division multiplexing (TDM) channelization. A larger bandwidth is supported through port binding. For example, eight 100 gigabits per second (Gbps) ports are bound to implement an 800 Gbps bandwidth. With the channelization technology, flexible bandwidth allocation is implemented based on a slot, diversified service access rate is supported, and there is no need to be constrained by a stepped rate system formulated by the Institute of Electrical and Electronics Engineers (IEEE) 802.3 standard. For example, an N*100 Gbps (N is generally less than or equal to 8) interface is divided into N*20 slots, and each slot is 5 Gbps. Therefore, the FlexE may support a K*5 Gbps service bandwidth through slot allocation. Because a basic unit for bandwidth allocation in the FlexE needs to be 5 Gbps, the FlexE has a bearing efficiency problem for a service whose granularity is not 5 Gbps, including a service less than 5 Gbps. The FlexE introduces a slot-based bandwidth configuration management method. When a bandwidth of a service needs to be adjusted, the FlexE needs to transfer a slot configuration table of N*20 slots of an entire interface group (for example, if a slot table A is currently used, a slot table B is modified and transferred), and switch from the old slot table A to the slot table B obtained through adjustment. This manner may be applicable to a scenario in which a small quantity of slots exists, for example, N*20 (N is generally less than or equal to 8). However, for a massive slot scenario, for example, when hundreds of slots exist, this manner is very inefficient and time-consuming. It should be noted that the FlexE is not designed for hitless adjustment of a service. When a bandwidth of a service is expected to be adjusted from 5 Gbps to 10 Gbps, short service interruption is allowed.

An MTN provides functions such as channel forwarding and OAM based on the FlexE technology. A slot allocation granularity corresponding to the MTN is the same as that in the FlexE, that is, is also 5G. As a result, a bearing efficiency problem also exists, particularly for a service that has a fine-granularity bandwidth requirement, for example, 10 M and 100 M high-quality private line services.

An OTN is designed for bearing a constant bit rate (CBR) service in TDM such as a synchronous digital hierarchy (SDH) in an early stage, and has no bandwidth adjustment requirement. As an Ethernet packet service gradually becomes a mainstream service of the OTN, a hitless adjustment technology (G·7044, also referred to as G·HAO, Hitless Adjustment of flexible optical data unit (ODUflex) (GFP)) is introduced based on application of an ODUflex. In the G·HAO, software and hardware participate in bandwidth adjustment, and a service bandwidth is adjusted slowly. Application of an algorithm and complex protocol negotiation is included, and an overall mechanism is complex.

To resolve these problems, this disclosure proposes an efficient, concise, and highly reliable resource configuration management method for a service in a massive slot scenario, so that a service whose bandwidth needs to be adjusted can be adjusted without affecting another service.

FIG. 1 is a schematic diagram of an architecture of a communication system applicable to an embodiment of this disclosure. FIG. 1 includes at least one edge node such as an E1 and an E2 in FIG. 1, and may further include at least one intermediate node (or referred to as a forwarding node and a routing node) such as a P1, a P2, and a Pn in FIG. 1.

The solution in this disclosure may be applied to a network device that supports an interface such as an Ethernet interface, a FlexE interface, and an OTN interface. A network device product form includes a typical core router, an edge router, an OTN transmission device, a specific-scenario-oriented Internet Protocol Ran Access Network (IPRAN) box-shaped or frame-shaped transmission device, a Packet Transport Network (PTN) box-shaped or frame-shaped transmission device, and the like. An interface of a transmission device may be a FlexE interface, an OTN interface, an Ethernet interface, and the like, or a channel divided by these interfaces, as shown in FIG. 2.

This disclosure may be applied to a scenario in which a service transmission resource needs to be dynamically adjusted end-to-end and/or between any two devices, for example, a scenario in which a service is added, a service is deleted, a transmission resource of a service is added to increase a service bandwidth, and a transmission resource of a service is reduced to reduce a service bandwidth, and a scenario in which a slot corresponding to a service is reconfigured based on a delay optimization requirement. In FIG. 1, any two adjacent nodes communicate with each other by using a transmission channel, and the transmission channel is used to transmit a data frame between the two adjacent nodes. The transmission channel may be a transmission channel whose rate is N*5 Gbps in the MTN or the FlexE, where N may be greater than or equal to 1, or may be a transmission channel having one of ODU rates in the OTN or an optical service unit (OSU) rate. This is not limited in this disclosure. One data frame includes an overhead and a payload, and the payload includes N slots. Optionally, one data frame may include M basic frames, and each basic frame includes a sub-overhead and a sub-payload. The sub-payload in each basic frame includes L slots, and the payload in the data frame is a set of sub-payloads in the M basic frames in the data frame. In other words, the N slots included in the payload in the data frame are a set of L slots in each basic frame in the M basic frames, and N=M×L, where M and L are integers greater than 0.

For example, a path-layer service channel transmits a fine-granularity slot (for example, a 10 megabits per second (Mbps) slot), to transmit fine-granularity business private line service information. In a 5 Gbps channel shown in FIG. 3, a data frame (a data frame n and a data frame n+1 in FIG.

3) is transferred from one node to the other node by using a channel between two nodes. One data frame (or referred to as a multi-frame) includes 20 basic frames. Each basic frame has a fixed length, and includes a total of 197 code blocks that include one start ($S_0$) code block, 195 data (D) code blocks, and one termination ($T_7$) code block. Each code block includes 8 bytes. The 195 data code blocks and the termination ($T_7$) code block provide load of 195×8+7 bytes. The load includes a 7-byte sub-overhead and a 1560-byte sub-payload. The sub-payload is divided into 24 65-byte fine-granularity slots. 20 basic frames in one multi-frame include a total of 480 10 Mbps slots. In other words, a payload in one multi-frame is a set of sub-payloads in 20 basic frames, and includes a total of 480 slots. The 480 10 Mbps slots implement a 5 Gbps channel. The sub-overhead in each basic frame may include a multi-frame indication (MFI), and a valid value is 0 to 19, to indicate a specific order of each basic frame in the basic frames in the multi-frame.

For another example, in a 10 Gbps channel, one multi-frame includes 40 basic frames. For 40 basic frames in one data frame, a valid value of an MFI is 0 to 39, and the 40 basic frames include a total of 960 (40×24) 10 Mbps slots. In other words, a payload in one data frame includes 960 slots. However, this is not limited in this disclosure.

In a massive slot scenario, for a scenario in which a service corresponds to a fixed slot, a service corresponds to a slot whose condition is determined, a service corresponds to a slot that is uncertain due to a time change, and the like, this disclosure proposes to dynamically adjust a slot corresponding to a service, to implement on-demand dynamic adjustment of a service bandwidth, and improve resource utilization.

It should be noted that, in embodiments of this disclosure, a bandwidth of a service is adjusted based on a quantity of slots corresponding to the service. For example, in a 5 Gbps channel, if one service is configured to correspond to two 10 Mbps slots, a bandwidth of the service is 2*10 Mbps=20 Mbps. In the following descriptions, that a quantity of slots corresponding to a service is changed may be understood as changing a bandwidth of the service, for example, reducing the quantity of slots corresponding to the service means reducing the bandwidth of the service, and increasing the quantity of slots corresponding to the service means increasing the bandwidth of the service.

FIG. 4 is a schematic flowchart of a resource configuration method according to an embodiment of this disclosure.

A first node and a second node in the embodiment in FIG. 4 may be two adjacent nodes. For example, in FIG. 1, the first node may be the P1, and the second node may be the P2, or the first node may be the P2, and the second node may be the P1. However, this is not limited in this disclosure. A transmission channel between the first node and the second node is a first channel, and the first node and the second node communicate with each other by using the first channel. The first channel includes N slots. For example, the first channel is a 5 Gbps channel, and includes 480 10 Mbps small-granularity slots. Alternatively, the first node sends the foregoing data frame to the second node by using the first channel. The first channel includes N slots in each data frame transmitted by using the first channel.

S410. The first node sends first information to the second node, to request to change a correspondence between a first slot in the first channel and a first service.

Correspondingly, the second node receives the first information from the first node. The first information includes an identifier (or a number, a sequence number, or an index value) of the first slot and an identifier of the first service. A process of changing a correspondence between a slot and a service may be referred to as a slot configuration process or a process of configuring a slot, and the first information is request information in the slot configuration process.

Optionally, the first information may include a field A, and the field A is used to indicate that the first information belongs to information in the slot configuration process. Optionally, the field A may be referred to as an information type field.

For example, when the information type field indicates a first value, it indicates that the first information is related information for changing the correspondence between a slot and a service, or it indicates that the first information is information in the slot configuration process. Optionally, when the information type field indicates another value, a bit string that carries the first information may be used to indicate other information.

Optionally, the first information may further include a field B, and the field B is used to indicate that the first information is request information (REQ) in the slot configuration process. The field B may be referred to as an operation type field.

For example, FIG. 5 is a schematic diagram of a structure of first information. The first information includes an information type field, an operation type field, a service identifier field, and a slot identifier field. In the first information, the service identifier field indicates the identifier of the first service, and the slot identifier field indicates the identifier of the first slot.

It should be noted that the schematic diagram of the structure of the information in this embodiment of this disclosure is only an example, and a sequence between the fields in the information is not limited in this disclosure. For example, FIG. 5 is only a schematic diagram of the first information. A specific sequence of the four fields in the first information is not limited in this disclosure. Optionally, two fields may be spaced apart by another field or one or more bits.

Optionally, the first information may be carried in a sub-overhead in a first basic frame, and the first basic frame is one of basic frames included in a first data frame sent by the first node to the second node. The first slot is a slot in a data frame (denoted as a second data frame) later than the first data frame in terms of time. In specific implementation, the second data frame and the first data frame may be spaced apart by one or more data frames. For example, the second data frame may be determined based on fourth information described below, or may be determined based on a protocol specification or a system configuration. However, this is not limited in this disclosure. The first slot may be a slot in a second basic frame in the second data frame, and a location (such as a number, an index, or a time location) of the second basic frame in the second data frame may be the same as or different from a location of the first basic frame in the first data frame. A location of the first slot in the second data frame is determined based on the identifier of the first slot in the first information.

Figure 3:
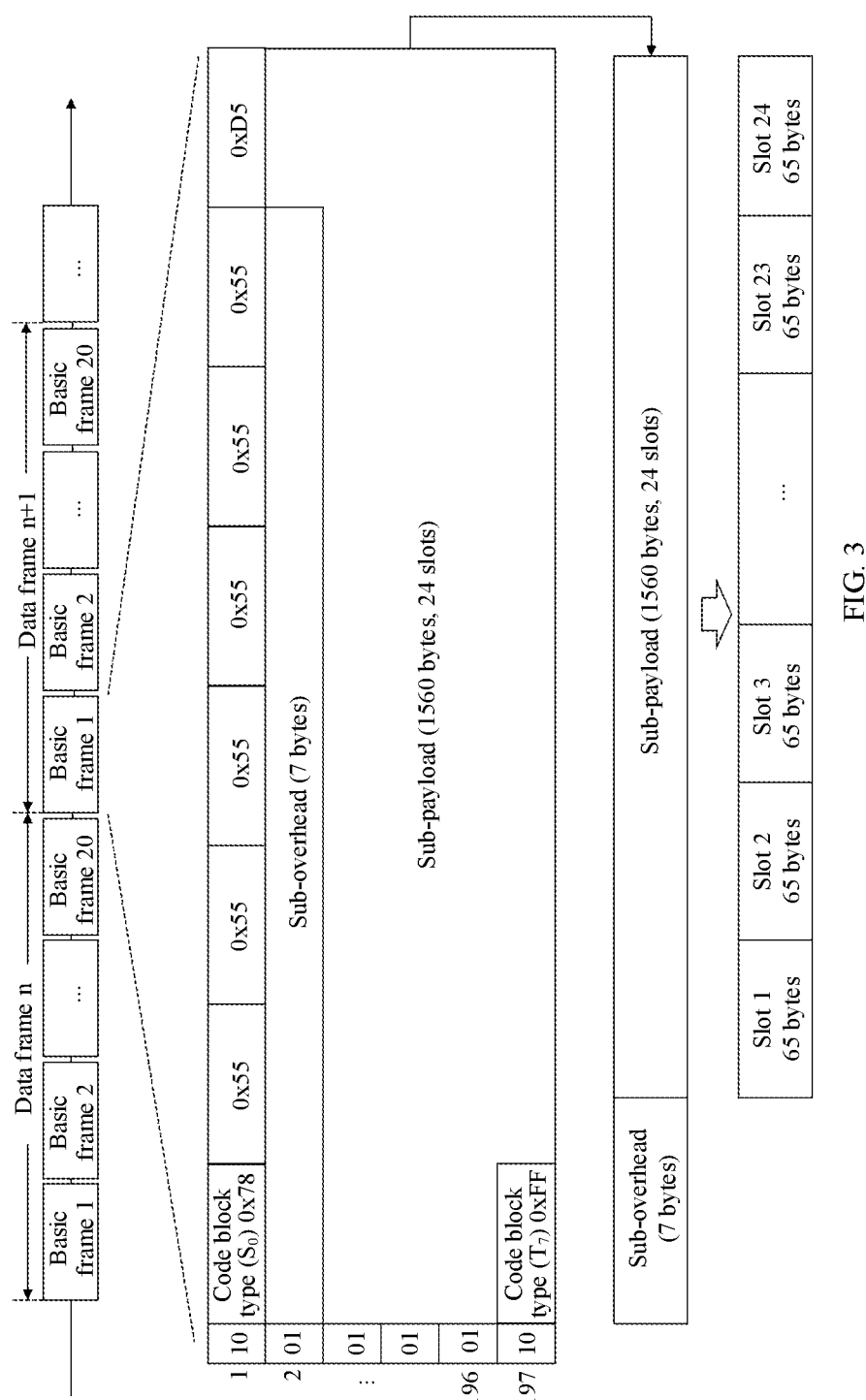
FIG. 3 is a schematic diagram of a data frame according to an embodiment of this disclosure.

For example, the data frame is a data frame in a flexible small-granularity technology. A structure of the basic frame is shown in FIG. 3. The first information is carried in a 56-bit sub-overhead in the first basic frame. The sub-overhead may include the foregoing MFI and a bit reserved for backward compatibility of the MFI. The first information may be carried in a remaining bit in the sub-overhead in the first basic frame. A basic frame corresponding to each sub-overhead may include an information type field. When the information type field indicates a first value, it indicates that the sub-overhead carries the information in the slot configuration process. When the information type field indicates another value, it indicates that the sub-overhead carries other information. For example, when the information type field indicates a second value, it indicates that the sub-overhead carries management channel information. However, this is not limited in this disclosure.

In an implementation, when the sub-overhead carries the information in the slot configuration process, the sub-overhead includes an operation type field, and the operation type field may indicate a specific piece of information that is in a plurality of pieces of information in the slot configuration process and that is carried by the sub-overhead.

For example, the slot configuration process includes request information, response information, and configuration effective information. The response information may include an acknowledgment response and a rejection response, the acknowledgment response is used to indicate to acknowledge or accept a slot configuration request, and the rejection response is used to indicate to reject the slot configuration request. The operation type field may include but is not limited to the following at least one indication manner:

When the operation type field indicates a second value, it indicates that the sub-overhead is request information or the sub-overhead is used to carry request information; when the operation type field indicates a third value, it indicates that the sub-overhead is acknowledgement response information or the sub-overhead is used to carry acknowledgement response information; when the operation type field indicates a fourth value, it indicates that the sub-overhead is rejection response information or the sub-overhead is used to carry rejection response information; and when the operation type field indicates a fifth value, it indicates that the sub-overhead is configuration effective information or the sub-overhead is used to carry configuration effective information.

For example, the operation type field may include 2 bits, where "00" indicates that the sub-overhead carries request information, "01" indicates that the sub-overhead is used to carry acknowledgement response information; "01" indicates that the sub-overhead is used to carry rejection response information; and "11" indicates that the sub-overhead is used to carry configuration effective information. However, this is not limited in this disclosure.

For example, the operation type field may include 4 bits, where "1000" indicates that the sub-overhead carries request information, "0100" indicates that the sub-overhead is used to carry acknowledgement response information; "0010" indicates that the sub-overhead is used to carry rejection response information; and "0001" indicates that the sub-overhead is used to carry configuration effective information. However, this is not limited in this disclosure.

FIG. 6 is a schematic diagram of an information type field and an operation type field in a sub-overhead. Optionally, for backward compatibility and expansion, one or more bits adjacent to the information type field and/or the operation field may be used as a reserved bit (RES).

For example, the information type field includes 2 bits, and the operation type field includes 4 bits. Remaining 48 bits other than the MFI and the reserved bit in the sub-overhead in the first basic frame may be used to carry the first information. The may include a field shown in FIG. 7. The first information indicates to change a correspondence between a service whose identifier is 308 (that is, the first service is the service 308) and a slot whose identifier is 291

(that is, the first slot is the slot 291). In the first information, the information type field indicates "00", indicating that the sub-overhead is used to carry the information in the slot configuration process; the operation type field indicates "1000" (namely, a second value), indicating that the first information is request information; the slot identifier field includes 12 bits, and indicates "110001001000", that is, the identifier of the first slot is 291, and is hexadecimally represented as 0×123; and the service identifier field includes 12 bits, and indicates "001011001000", that is, the identifier of the first service is 308, and is hexadecimally represented as 0×134. However, this is not limited in this disclosure. Optionally, another bit in the sub-overhead may include other indication information, or is used as a reserved field. Optionally, the first information further includes a check field, for example, may be 7-bit cyclic redundancy check (CRC) check information. The CRC check information may be generated based on 41 bits other than the check field in the first information, or may be generated based on some fields in the first information, for example, generated based on a bit other than the check field and the reserved bit. This is not limited in this disclosure.

Figure 8:
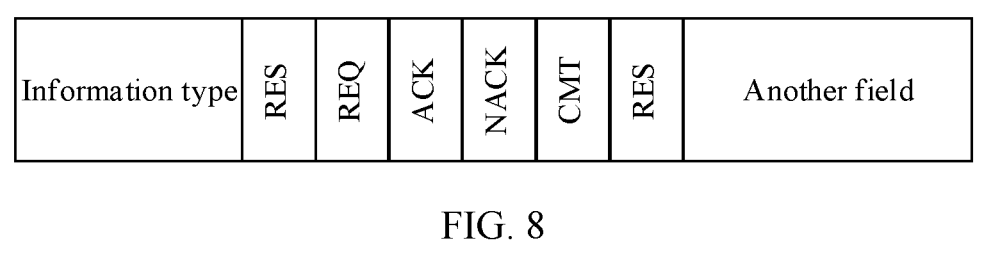

In another implementation, when the sub-overhead carries the information in the slot configuration process, the sub-overhead includes a request information indication field (denoted as REQ), an acknowledgment response information indication field (denoted as ACK), a rejection response information indication field (denoted as NACK), and a configuration effective information indication field (configuration commit (CMT)), for example, as shown in FIG. 8.

For example, each of the REQ field, the ACK field, the NACK field, and the CMT field is 1 bit. When one of the four fields is set to "1", the other fields in the four fields are set to "0". For example, if the REQ field is set to "1", it indicates that the sub-overhead carries request information, and the ACK field, the NACK field, and the CMT field in the are all set to "0". If the first information indicates to change a correspondence between a service whose identifier is 308 (that is, the first service is the service 308) and a slot whose identifier is 291 (that is, the first slot is the slot 291), the first information may be shown in FIG. 9.

In this disclosure, the first information requests to change the correspondence between the first slot and the first service. The first information may request to release the correspondence between the first slot and the first service, or the first information is used to request to delete the first slot from a slot corresponding to the first service, to reduce a bandwidth of the first service. Alternatively, the first information may request to establish the correspondence between the first slot and the first service, or the first information is used to request to add the first slot to a slot corresponding to the first service, to increase a bandwidth of the first service.

In an implementation, before the correspondence is changed, if the slot corresponding to the first service includes the first slot, the first information is used to indicate to release the correspondence between the first service and the first slot; or if the slot corresponding to the first service does not include the first slot, the first information is used to indicate to establish the correspondence between the first service and the first slot.

For example, when the first node determines to delete the first slot from the slot corresponding to the first service, that is, to release the correspondence between the first slot and the first service, the first node sends the first information. After receiving the first information, the second node determines that the slot corresponding to the first service currently includes the first slot. In this case, the second node determines that the first information indicates to delete the first slot from the slot corresponding to the first service, to reduce the bandwidth of the first service.

For another example, when the first node determines to add the first slot to the slot corresponding to the first service, that is, to establish the correspondence between the first service and the first slot, the first node sends the first information. After receiving the first information, the second node determines that the slot corresponding to the first service currently does not include the first slot. In this case, the second node determines that the first information requests to add the first slot to the slot corresponding to the first service, to increase the bandwidth of the first service.

In another implementation, the first information includes a first field, and the first field is used to indicate that the first information requests to release or establish the correspondence between the first service and the first slot.

For example, the first field includes 1 bit. When the first field is set to "1", it indicates that the first information requests to release the correspondence between the first service and the first slot. When the first field is set to "0", it indicates that the first information requests to establish the correspondence between the first service and the first slot. Alternatively, when the first field is set to "0", it indicates that the first information requests to release the correspondence between the first service and the first slot. When the first field is set to "1", it indicates that the first information requests to establish the correspondence between the first service and the first slot. However, this is not limited in this disclosure.

For another example, the first field may be the foregoing operation indication field. When the operation indication field indicates a first value, it indicates that the sub-overhead carries request information and requests to establish the correspondence between a service and a slot. When the operation indication field indicates a sixth value, it indicates that the sub-overhead carries request information and requests to release the correspondence between a service and a slot.

For example, the operation type field may include 3 bits, where "001" (namely, the first value) indicates that the sub-overhead carries request information and requests to establish the correspondence between a service and a slot; "010" (namely, the sixth value) indicates that the overhead carries request information and requests to release the correspondence between a service and a slot; "011" indicates that the sub-overhead is used to carry acknowledgement response information; "100" indicates that the sub-overhead is used to carry rejection response information; and "101" indicates that the sub-overhead is used to carry configuration effective information. However, this is not limited in this disclosure.

S420. The second node sends second information to the first node, to indicate to acknowledge or reject the request in the first information.

Correspondingly, the first node receives the second information from the second node. After receiving the first information from the first node, the second node determines, based on a case, a capability, and the like of the second node, to accept (that is, acknowledge) or reject the change request from the first node, and sends the second information to notify the first node.

Optionally, the second information is carried in a sub-overhead in one basic frame sent by the second node to the first node.

Optionally, the second information includes a field C, and the field C is used to indicate whether the second information is the foregoing acknowledgement response information or the foregoing rejection response information.

For example, the field C is the foregoing operation type field. For example, the operation type field includes 2 bits. When the operation type field indicates a "second value" (for example, "10"), it indicates that the second information is acknowledgement response information, as shown in (a) in FIG. 10. When the operation type field indicates a "third value" (for example, "11"), it indicates that the second information is rejection response information, as shown in (b) in FIG. 10. However, this is not limited in this disclosure.

For another example, the field C includes an ACK field and a NACK field. When the ACK field is set to "1", it indicates that the second information is acknowledgement response information, as shown in (c) in FIG. 10. When the NACK field is set to "1", it indicates that the second information is rejection response information, as shown in (d) in FIG. 10. However, this is not limited in this disclosure.

For another example, the field C is 1-bit indication information. When the field C is set to "1", it indicates that the second information is acknowledgement response information. When the field C is set to "0", it indicates that the second information is rejection response information. However, this is not limited in this disclosure.

Optionally, the second information may further include the identifier of the first slot and an identifier of a first task.

The second information includes the identifier of the first slot and the identifier of the first task, so that after receiving the second information, the first node can determine that the response information is response information of the first information. This can improve reliability of signaling interaction.

For example, the second information may be shown in (a) in FIG. 11. The operation type field indicates "0100", indicating that the second information is acknowledgement response information. A 12-bit slot identifier field included in the second information indicates the first slot, and a 12-bit service identifier field indicates the first service. Another bit in the second information may be used to indicate other information, or is used as a reserved bit. Optionally, the second information includes a check field, and the check field may be CRC check information generated based on all or some fields in the second information. However, this is not limited in this disclosure.

For another example, the second information may be shown in (b) in FIG. 11. The NACK field is set to "1", indicating that the second information is acknowledgement response information. A 12-bit slot identifier field included in the second information indicates the first slot, and a 12-bit service identifier field indicates the first service. The second information may further include a check field. The check field may be CRC check information generated based on all or some fields in the second information. However, this is not limited in this disclosure.

Optionally, the second information includes second check information. The second check information is check information generated by the second node based on service information that corresponds to a slot in the first channel and that exists after the correspondence between the first slot and the first service is changed.

After receiving the second information, the first node may compare whether the second check information is consistent with first check information, so that the first node determines that slot configurations of the two nodes are consistent. This can improve communication reliability. The first check information is check information generated by the first node based on service information that corresponds to a slot in the first channel and that exists after the correspondence between the first slot and the first service is changed.

For example, the second information may be shown in FIG. 12, and the second check information field may include 24 bits. However, this is not limited in this disclosure.

In an implementation, the second node generates the second check information based on service information that corresponds to the N slots in the first channel and that exists after the correspondence is changed.

For example, the first channel is a 5 Gbps channel, and includes 480 small-granularity slots, namely, 480 small-granularity slots formed by sub-payloads in 20 basic frames in one data frame. The second node arranges, in ascending or descending order of slot identifiers (such as numbers, sequence numbers, or index values), service identifiers corresponding to the 480 small-granularity slots. For example, if the service identifier includes 12 bits, the service identifiers corresponding to the 480 slots form a total of 12×480=5760 bits. A slot for which no corresponding service is configured may be replaced with all "0s" or all "1s". The second node generates the second check information based on the arranged 5760 bits. However, this is not limited in this disclosure.

Optionally, the check information may be generated by using CRC, a message digest 5 algorithm, and a secure hash algorithm (SHA). The SHA may be an SHA1 or an SHA256.

In another implementation, the second node generates the second check information based on service information that corresponds to K slots in the N slots and that exists after the correspondence is changed, where K is less than or equal to N.

For example, corresponding services are configured for the K slots in the N slots, and no corresponding service is configured for the other N-K slots. In this case, the second node generates the second check information based on service identifiers corresponding to the K slots, for example, generates the second check information after the service identifiers corresponding to the K slots are arranged in ascending or descending order of slot identifiers. However, this is not limited in this disclosure.

It should be noted that a manner in which the first node generates the first check information is the same as a manner in which the second node generates the second check information, so that the first node and the second node determine whether stored slot configuration information is the same, to ensure communication reliability.

S430. The first node sends fourth information to the second node to indicate to apply the changed correspondence.

Correspondingly, the second node receives the fourth information from the first node. The fourth information is the foregoing configuration effective information. The first node receives the second information from the second node. If the second information indicates to acknowledge the request in the first information, the first node may notify, by using fourth information, the second node to apply the changed correspondence, that is, the fourth information notifies the second node to enable the changed correspondence to take effect.

Optionally, the fourth information is carried in an overhead in a third data frame sent by the first node to the second node.

The fourth information may be carried in a sub-overhead in one basic frame in the third data frame.

Optionally, the fourth information includes a field D, and the field D is used to indicate whether the fourth information is configuration effective information.

For example, the field D may be the foregoing operation type field. When the operation type field indicates a "fifth value", it indicates that the sub-overhead carries the fourth information, namely, the configuration effective information. Alternatively, the field D is the foregoing CMT field, and the CMT field is set to "1", indicating that the sub-overhead carries the fourth information.

In an implementation, a protocol specifies, a system presets, or a system preconfigures a quantity of data frames spaced between the third data frame and a data frame (that is, the second data frame) in which the changed correspondence is applied.

For example, the protocol specifies that the first node and the second node start to apply the changed correspondence between the first slot and the first service in a Kth data frame after the third data frame. For example, it may be specified that the first node and the second node start to apply the changed correspondence in a next data frame of the third data frame. If the first information requests to release the correspondence between the first service and the first slot, after the first node sends the fourth information in the third data frame, the first node and the second node start to apply the changed correspondence in a next data frame of the third data frame, that is, in the next data frame of the third data frame and a subsequent data frame, the first slot does not carry data of the first service. However, this is not limited in this disclosure.

In another implementation, the fourth information includes a field D, and the field D is used to indicate a quantity of data frames that are spaced between the second data frame and the third data frame.

For example, after determining to start to apply the changed correspondence between the first slot and the first service in the second data frame, the first node sends the fourth information to the second node. The field D in the fourth information indicates the quantity of data frames spaced between the second data frame and the third data frame in which the fourth information is located. After receiving the fourth information, the second node determines the second data frame based on the field D. The first node and the second node start to apply the changed correspondence between the first slot and the first service in the second data frame. If the first information requests to establish the correspondence between the first service and the first slot, in the second data frame and a subsequent data frame, the first slot carries data of the first service. However, this is not limited in this disclosure.

Optionally, the fourth information includes the identifier of the first slot and the identifier of the first service.

For example, the fourth information may be shown in (a) in FIG. 13. The fourth information includes a 12-bit slot identifier indicating the first slot and a 12-bit service identifier indicating the first service, and another bit in the fourth information may be used to indicate other information, or is used as a reserved bit. Optionally, the fourth information further includes a check field, and the check field may be CRC check information generated based on all or some fields in the fourth information. However, this is not limited in this disclosure.

The fourth information includes the identifier of the first slot and the identifier of the first task, so that after receiving the fourth information, the second node can determine that the configuration effective information is information indicating to apply the changed correspondence between the first slot and the first service. This can improve reliability of signaling interaction.

Optionally, the fourth information includes the first check information. The first check information is check information generated by the first node based on service information that corresponds to a slot in the first channel and that exists after the correspondence between the first slot and the first service is changed.

For example, the fourth information may be shown in (b) in FIG. 13. The fourth information includes 24-bit first check information, and another bit in the fourth information may be used to indicate other information, or is used as a reserved bit. Optionally, the fourth information includes a check field, and the check field may be CRC check information generated based on all or some fields in the fourth information. However, this is not limited in this disclosure.

For an implementation in which the first node generates the first check information, refer to the implementation in which the second node generates the second check information. For brevity, details are not described herein again. It should be noted that a manner in which the first node generates the first check information is the same as a manner in which the second node generates the second check information, so that after receiving the fourth information, the second node can determine whether the first check information is the same as the second check information.

Optionally, the first node sends the fourth information in a plurality of basic frames in the third data frame.

For example, the first node sends the fourth information in the first three basic frames in the third data frame. When the fourth information is sent a plurality of times, a probability that the second node successfully receives the fourth information can be improved, to improve communication reliability. When the fourth information is sent in the first three basic frames, the second node can have enough processing time to apply the changed correspondence between a slot and a service. However, this is not limited in this disclosure.

S440. The first node and the second node start to apply the changed correspondence between the first service and the first slot in the second data frame.

After the first node sends the fourth information, and the second node receives the fourth information, the first node and the second node determine the second data frame in which the changed correspondence starts to be applied, and starts to apply the changed correspondence in the second data frame.

Based on the foregoing solution, in a massive slot scenario, for a scenario in which a service corresponds to a specified slot, the slot corresponding to the service is dynamically adjusted, to implement on-demand dynamic adjustment of a service bandwidth, and improve resource utilization.

Figure 14:
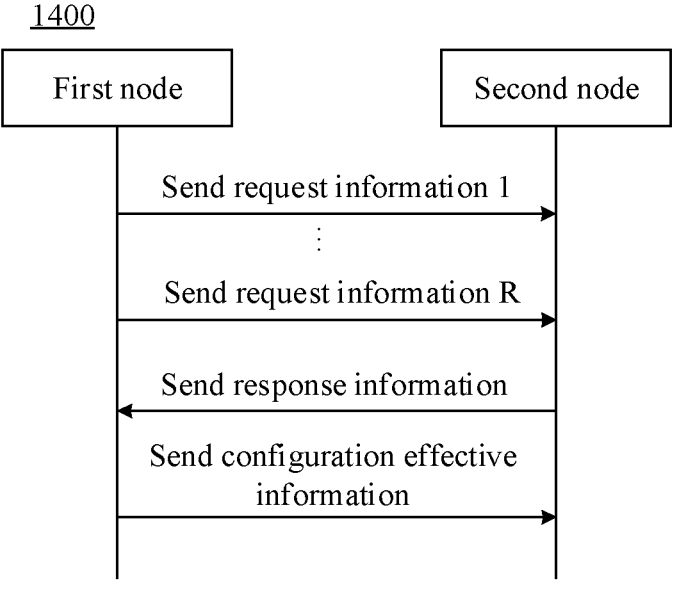
FIG. 14 is another schematic flowchart of a resource configuration method according to this disclosure.

The embodiment shown in FIG. 4 provides a method for changing a correspondence between one slot and a service in one slot configuration process. FIG. 14 is another schematic flowchart of a resource configuration method according to an embodiment of this disclosure.

It should be noted that, for a part that is in the embodiment in FIG. 14 and that is the same as or similar to that in the embodiment in FIG. 4, refer to the descriptions in the embodiment in FIG. 4. For brevity, details are not described herein again.

In the resource configuration method shown in FIG. 14, a correspondence between a plurality of slots and a service can be changed in one slot configuration process. When a first node needs to change a correspondence between a plurality of slots in a first channel and a service, the first node sends a plurality of pieces of request information to the second node, for example, a total of R pieces of request information from request information 1 to request information R in the figure. Each piece of request information is used to request to change a correspondence between one slot and a service. The R pieces of request information are separately carried in sub-overheads in R basic frames.

Optionally, the request information includes an identifier of a first task, and the first task is used to change a correspondence between at least one slot in the first channel and a service, that is, the first task is a slot configuration process for changing a correspondence between at least one slot and a service. The first node notifies, by using the R pieces of request information, the second node of a correspondence that is between a slot and a service and that needs to be changed in the first task.

Based on the foregoing solution, the request information includes the identifier of the first task, so that after receiving the request information, the second node determines a task corresponding to the request information.

Optionally, the request information includes a quantity of correspondences that are between a slot and a service and that are to be changed in the first task.

For example, a correspondence between P slots and a service needs to be changed in the first task, and the request information includes the quantity P, so that the second node can determine, based on the quantity P, that all pieces of request information corresponding to the first task are received, to ensure reliability of information exchange.

Optionally, the request information includes a second field, and the second field indicates whether the request information is the last piece of request information corresponding to the first task.

The second node may determine, based on the second field, whether all the pieces of request information corresponding to the first task are received. When all the pieces of request information corresponding to the first task are received, the second node may determine, based on the received request information, and a case, a capability, and the like of the second node, to accept or reject the correspondence change request in the request information, to send response information to the first node.

For example, the request information may be shown in FIG. 15. The request information includes a 3-bit sequence (SEQ) field indicating the identifier of the first task, a 6-bit number (Num) field indicating a quantity of correspondences that are between a slot and a service and that are to be changed in the first task, and a 1-bit little endian (LE) field indicating whether the request information is the last piece of request information corresponding to the first task. For example, when the first task needs to process a correspondence between two slots and a service, the first task corresponds to two pieces of request information. As shown in FIG. 16, the identifier of the first task is 2, and in the request information, the SEQ field indicates "010", and the Num field indicates "000010", indicating that the first task needs to process the correspondence between two slots and a service. Request information 1 requests to change a correspondence between a slot whose identifier is 290 and a service whose identifier is 308, the request information 1 is not the last piece of request information corresponding to the first task, and an LE field in the request information 1 indicates "0". Request information 2 requests to change a correspondence between a slot whose identifier is 291 and a service whose identifier is 308, the request information 2 is the last piece of request information corresponding to the first task, and an LE field in the request information 2 indicates "1". After receiving the request information 2, the second node determines, based on the LE field that indicates "1" and that is in the request information 2, that the request information is the last piece of request information corresponding to the first task, and after determining that the request that is for changing the correspondence between two slots and a service and that is indicated by the Num field is received, determines whether to accept the change request corresponding to the first task, to send response information to the first node. However, this is not limited in this disclosure.

Optionally, the last piece of request information corresponding to the first task includes first check information. The first check information is generated by the first node based on service information that corresponds to a slot in the first channel and that exists after the correspondence is changed.

For example, when the first task needs to process a correspondence between two slots and a service, the first task corresponds to three pieces of request information. The first two pieces of request information, namely, request information 1 and request information 2, include an identifier of a slot and an identifier of a service, where a correspondence between the slot and the service needs to be changed, and an LE field in each of the two pieces of request information indicates "0", indicating that the request information is not the last piece of request information corresponding to the first task. The third piece of request information, namely, request information 3, corresponding to the first task is shown in FIG. 17. The request information 3 includes the first check information, and an LE field in the request information 3 indicates "1", indicating that the request information 3 is the last piece of request information. However, this is not limited in this disclosure.

After receiving, from the first node, all the pieces of request information corresponding to the first task, the second node determines whether to accept the change request corresponding to the first task, and sends the response information to the first node.

Optionally, the response information is carried in a sub-overhead in one basic frame sent by the second node to the first node.

Optionally, the response information includes an LE field, a Num field, and an SEQ

FIELD

In an implementation, the response information includes an identifier of a slot and an identifier of a service, where a correspondence between the slot and the service is changed last in the first task.

For example, request information corresponding to the first service is the request information 1 and the request information 2 in FIG. 16. In this case, in the correspondence changed last in the first task, the slot is the slot 291, and the service is the service 308. As shown in (a) in FIG. 18, a slot identifier included by the second node in the response information is 291, and the service identifier is 308. An operation type field in the response information indicates "0100", indicating that the response information is acknowledgement response information. However, this is not limited in this disclosure.

In another implementation, the response information includes second check information.

For example, as shown in (b) in FIG. 18, an operation type field in the response information indicates "0100", indicating that the response information is acknowledgement response information. However, this is not limited in this disclosure.

After the first node receives the response information from the second node, when the response information is acknowledgement response information, the first node sends configuration effective information to the second node.

Optionally, the configuration effective information is carried in a sub-overhead in one basic frame sent by the first node to the second node.

Optionally, the configuration effective information includes an LE field, a Num field, and an SEQ field.

In an implementation, the response information includes an identifier of a slot and an identifier of a service, where a correspondence between the slot and the service is changed last in the first task.

In another implementation, the response information includes the second check information.

Optionally, the first node sends the fourth information in a plurality of basic frames in a third data frame.

Based on the foregoing solution, in a massive slot scenario, for a scenario in which a service corresponds to a specified slot, the slot corresponding to the service is dynamically adjusted, to implement on-demand dynamic adjustment of a service bandwidth, and improve resource utilization.

An embodiment of this disclosure further provides a resource configuration verification method. A first node generates first check information based on service information corresponding to a slot in a first channel, and sends check request information to a second node, where the check request information includes the first check information. After receiving the check request information, the second node compares whether the first check information is consistent with second check information are consistent. When the first check information is consistent with the second check information are consistent, the second node sends response information to the first node.

Optionally, the check request information is carried in a sub-overhead in one basic frame sent by the first node to the second node.

For example, the check request information may be shown in (a) in FIG. 19, and includes a first check information field. An operation type field may indicate a seventh value, for example, may indicate "1111", indicating that the sub-overhead carries the check request information. Optionally, the check request information may include an LE field that indicates "1", indicating that the check request information is transmitted only once in the current check. To distinguish between a plurality of pieces of check request information, the check request information may include an SEQ field, indicating an identifier of a check request task. However, this is not limited in this disclosure.

Optionally, the first node may periodically send the check request information.

Optionally, after receiving the check request information and determining whether the first check information is consistent with the second check information, the second node may send check response information to the first node.

For example, the check response information may be shown in (a) in FIG. 19, and includes a second check information field. An operation field may indicate an eighth value, for example, may indicate "1110", indicating that the sub-overhead carries the check response information. Optionally, the check response information may include an LE field and an SEQ field. However, this is not limited in this disclosure.

For another example, the operation field in the check response information may indicate an eighth value, for example, may indicate "1110", indicating that the sub-overhead carries the check request information. The check response information further includes a response field used to indicate whether the check information is the same. However, this is not limited in this disclosure.

Optionally, when the first check information is the same as the second check information, it indicates that slot configurations applied by the first node and the second node are the same, and communication may be normally performed. When the first check information is different from the second check information, the first node and the second node may reconfigure, by using the slot configuration process that is of configuring services corresponding to a plurality of slots and that is shown in FIG. 14, a service corresponding to a slot in the first channel. However, this is not limited in this disclosure.

Based on the foregoing solution, the check information is exchanged, so that it can be detected whether slot configurations of transmit and receive parties are consistent, and a communication failure or a service loss caused because slot configurations of two nodes are not consistent can be reduced.

The foregoing embodiments shown in FIG. 4 and FIG. 14 may be applied to the system shown in FIG. 1 to adjust a slot corresponding to a service between the E1 and the E2 (end-to-end), to increase or reduce an end-to-end service bandwidth.

Figure 20A:
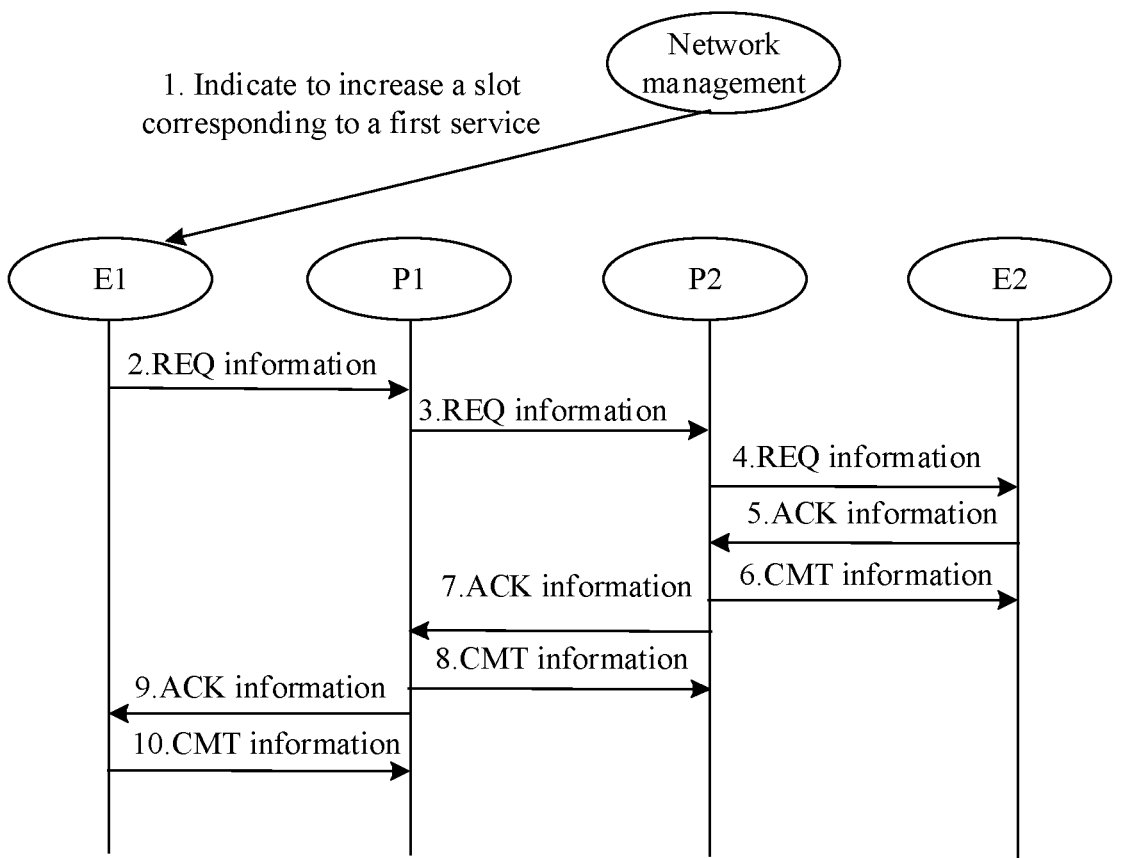
FIG. 20A to FIG. 20C are another schematic flowchart of a resource configuration method according to an embodiment of this disclosure.
Figure 20B:
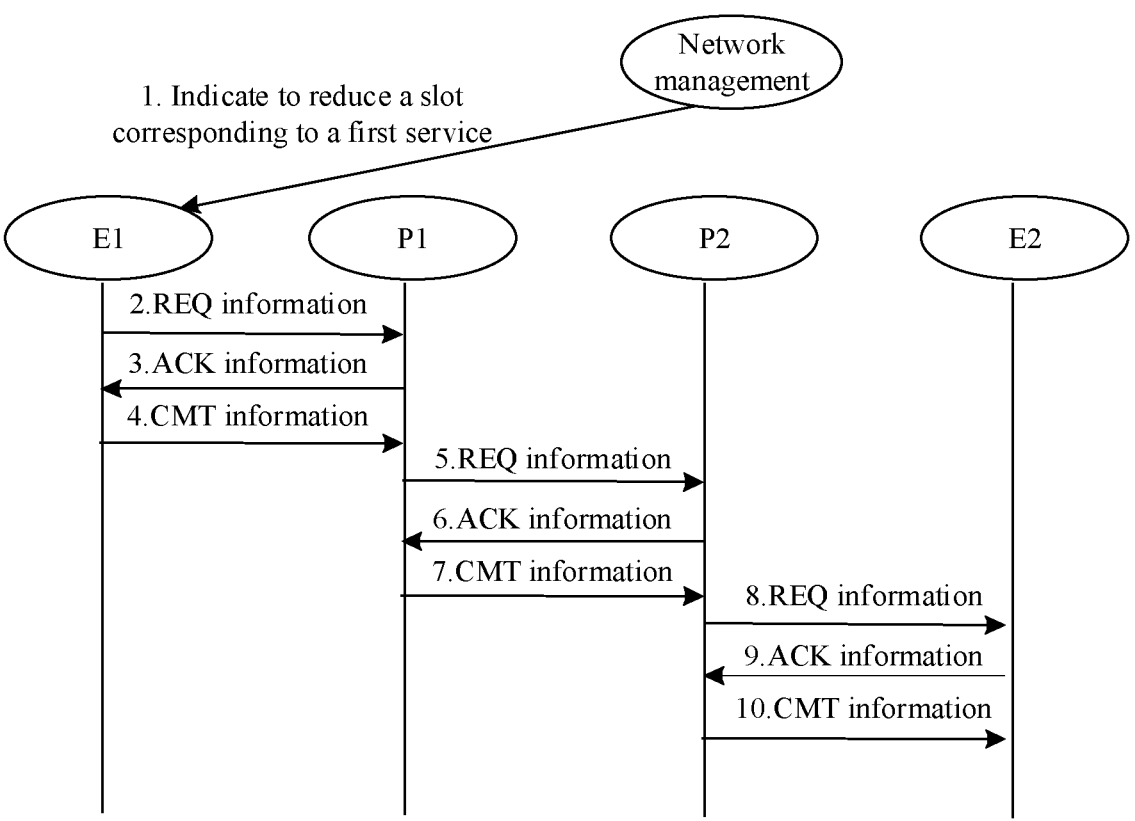
Figure 20C:
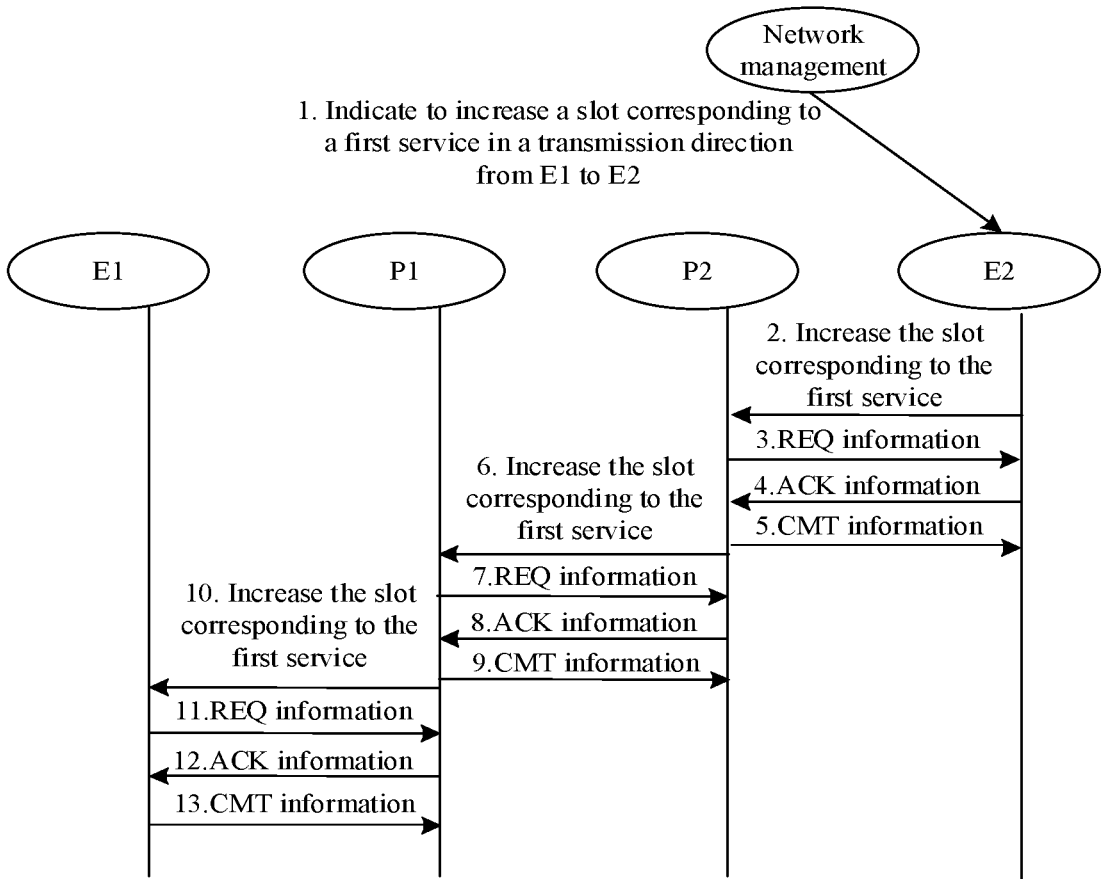

FIG. 20A to FIG. 20C are another schematic flowchart of a resource configuration method according to this disclosure.

It should be noted that, in FIG. 20A to FIG. 20C, an example in which an end-to-end service link includes four nodes such as an E1, a P1, a P2, and an E2 is used for description. However, this is not limited in this disclosure.

In an implementation, when a service bandwidth needs to be adjusted, for example, when a quantity of slots corresponding to a first service in a transmission direction from the E1 to the E2 needs to be adjusted, in FIG. 20A to FIG. 20C, a network management device analyzes feasibility of end-to-end bandwidth adjustment. If end-to-end bandwidth adjustment is feasible, the network management device sends fifth information to the node E1. The fifth information is used to indicate to increase or reduce the quantity of timeslots corresponding to the first service in the transmission direction from the E1 to the E2, or the fifth information is used to indicate to increase or reduce a bandwidth of the first service in the transmission direction from the E1 to the E2, for example, step 1 shown in FIG. 20A and FIG. 20B.

When the network management device notifies, by using the fifth information, the E1 to increase the bandwidth of the first service in the transmission direction from the E1 to the E2, for example, as shown in FIG. 20A, after receiving the fifth information from the network management device, the node E1 sends request information (denoted as REQ information) to the node P1. After receiving the REQ information sent by the node E1, the node P1 sends REQ information to the node P2, and the node P2 sends REQ information to the node E2. After receiving the REQ information from the P2, the peer node E2 determines, based on a case and a capability of the E2, to acknowledge or reject the request, and sends response information to the P2. If the E2 sends acknowledgment response information (denoted as ACK information) to the P2, the P2 sends configuration effective information (denoted as CMT information) to the E2. After sending the CMT information to the E2, the P2 sends response information to the P1. A processing procedure similar to that of the P2 is executed until the E1 sends CMT information. In this case, the slot configuration process is completed.

Based on the foregoing solution, when a service bandwidth needs to be increased, request information is first transmitted hop by hop or end-to-end, to first increase a downstream bandwidth of a node, and then increase an upstream bandwidth of the node. In this way, the following case can be avoided: because the downstream bandwidth of the node is less than the upstream bandwidth, data that arrives due to the large upstream bandwidth cannot be sent in a timely manner due to a limitation of the downstream bandwidth, and consequently the data is accumulated on the node, causing a delay or even a data loss due to buffer overflow. When data is transmitted from the E1 to the E2, a data transmission direction is from an upstream node to a downstream node. For example, when the node E1 sends the first service to the node P1, a quantity of slots corresponding to the first service may be referred to as an upstream bandwidth of the node P1. When the node P1 sends the first service to the node P2, a quantity of slots corresponding to the first service may be referred to as a downstream bandwidth of the node P1. When the upstream bandwidth of the node P1 is greater than the downstream bandwidth, data is accumulated on the node P1, and consequently the data may be lost due to buffer overflow. The method shown in FIG. 20A can avoid a case in which data is lost because the data is accumulated.

When the network management device notifies, by using the fifth information, the E1 to reduce the slot corresponding to the first service in the transmission direction from the E1 to the E2, for example, as shown in FIG. 20B, after receiving the fifth information from the network management device, the node E1 sends request information (denoted as REQ information) to the node P1. The P1 node determines, based on a case and a capability of the node P1, to acknowledge or reject the request, and sends response information to the E1. When the response information that is of the P1 and that is received by the E1 is acknowledgement response information, the E1 node notifies, by using CMT information, the P1 to enable the configuration to take effect, to complete reducing a bandwidth of the first service between the node E1 and the node P1 in a transmission direction from the E1 to the node P1. After the configuration between the node E1 and the node P1 takes effect, the node P1 sends REQ information to the node P2 to initiate a slot configuration process of increasing a service bandwidth. After the bandwidth of the first service in a transmission direction from the P1 to the node P2 is increased, the node P2 initiates a slot configuration process of increasing a service bandwidth between the node P2 and the node E2, so that the bandwidth of the first service in the transmission direction from the E1 to the E2 is increased.

Based on the foregoing solution, when a service bandwidth needs to be reduced, a bandwidth reduction process is first completed between two adjacent nodes, to reduce an upstream bandwidth of the node, and then reduce a downstream bandwidth of the node. Therefore, it can be ensured that the upstream bandwidth of the node is less than the downstream bandwidth, to avoid a case in which data is lost because data in a buffer is accumulated or overflows.

In another implementation, when a service bandwidth needs to be increased, as shown in FIG. 20C, the network management device analyzes feasibility of end-to-end bandwidth adjustment. If end-to-end bandwidth adjustment is feasible, the network management device performs step 1 to send fifth information to the node E2. The fifth information is used to indicate to increase the slot corresponding to the first service in a transmission direction of from the E1 to the E2 or reduce the bandwidth of the first service in a transmission direction from the E1 to the E2.

After receiving the fifth information, the node E2 performs step 2 to notify the node P2 to increase the slot corresponding to the first service, to trigger the node P2 to initiate the foregoing slot configuration process, so as to increase, by using steps 3, 4, and 5, a quantity of slots corresponding to the first service in a transmission direction from the node P2 to the node E2. After performing step 5, the P2 notifies the upstream node P1 to increase the slot corresponding to the first service, to trigger the node P1 to initiate the foregoing slot configuration process, so as to increase a quantity of slots corresponding to the first service in a transmission direction from the node P1 to the node P2. The P1 completes, by using a similar step, increasing a quantity of slots corresponding to the first service in a transmission direction from the node E1 to the node P1, to finally increase a quantity of slots corresponding to the first service in a transmission direction from the node E1 to the node E2.

Based on the foregoing solution, when a service bandwidth needs to be increased, the network management device notifies a downstream node, so that the downstream node and an adjacent upstream node first complete increasing the bandwidth, and then the downstream node notifies the upstream node to start a slot configuration process of increasing the bandwidth. This can avoid a case in which data is lost due to buffer accumulation or even buffer overflow because an upstream bandwidth of an intermediate node is greater than a downstream bandwidth.

Figure 21:
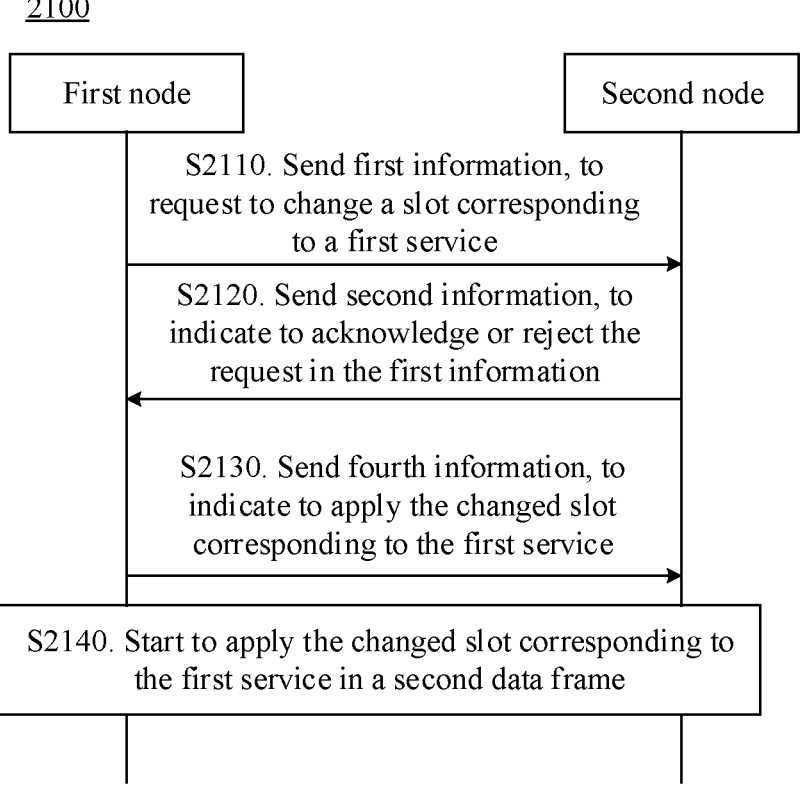
FIG. 21 is another schematic flowchart of a resource configuration method according to an embodiment of this disclosure.

FIG. 21 is another schematic flowchart of a resource configuration method according to an embodiment of this disclosure.

It should be noted that, when a part that is in the embodiment shown in FIG. 21 and that is the same as or detailed in the foregoing embodiment is not otherwise defined or described, references may be made to the descriptions in the foregoing embodiment. For brevity, details are not described herein again.

S2110. A first node sends first information to a second node, where the first information is used to indicate to change a slot corresponding to a first service.

Correspondingly, the second node receives the first information from the first node. The first information includes an identifier of the first service and a quantity of slots corresponding to the first service. The first information is used to notify the second node of a quantity of slots that correspond to the first service and that are in N slots in a first channel. For example, the first channel is a 5 Gbps channel, and includes 480 10 Mbps small-granularity slots. The first information indicates a quantity of slots (or a quantity of slots that carry data of the first service) that correspond to the first service and that are in the 480 slots. Alternatively, the first information is used to notify the second node of a quantity of slots that correspond to the first service and that are in one data frame.

In this embodiment, the first node notifies, by using request information (namely, the first information), the second node of the quantity of slots corresponding to the first service, and the second node determines, based on upstream slot allocation and downstream slot allocation, the slot corresponding to the first service, and notifies the first node by using response information in S2120.

Optionally, the first information may be carried in a sub-overhead in a first basic frame, and the first basic frame is one of basic frames included in a first data frame sent by the first node to the second node.

Optionally, the sub-overhead includes the foregoing information type field and the foregoing operation type field.

For example, the first information may be shown in (a) or (b) in FIG. 22. The information type field indicates "00", indicating that the sub-overhead carries information in a slot configuration process. The operation type field indicates "1000" or an REQ field indicates "1", indicating that the sub-overhead carries request information. A service identifier field indicates "110001001000", indicating that the first node requests to change a quantity of slots corresponding to a service 308. A slot quantity field indicates "3", indicating that the quantity of slots corresponding to the first service is changed to 3. In other words, after the change, the first service corresponds to three slots. However, this is not limited in this disclosure.

Optionally, the sub-overhead further includes an identifier of a first task, and the first task is used to update the slot corresponding to the first service.

Optionally, the sub-overhead further includes an LE field, and the LE field is used to indicate whether the response information is the last piece of response information corresponding to the first task, and/or the sub-overhead further includes a Num field, where the field is used to indicate the quantity of slots corresponding to the first service, or a quantity of slots that correspond to the first service and that need to be responded by using the response information.

It should be noted that the LE field and the Num field are mainly used in the response information. To maintain consistency of fields in sub-overheads in basic frames, the first information may also include the LE field and the Num field.

S2120. The second node sends second information to the first node, where the second information is used to indicate acknowledge or reject the request in the first information.

Correspondingly, the first node receives the second information from the second node. The second information includes the identifier of the first service and an identifier of a first slot.

Optionally, the second node may consider, based on an upstream slot configuration and/or a downstream slot configuration, a minimum delay of the data of the first service on the second node, to determine the slot corresponding to the first service.

Optionally, the second node determines, based on the identifier of the first service, the quantity of slots corresponding to the first service, and a first algorithm, the slot corresponding to the first service. For example, the first algorithm may be a sigma-delta algorithm, a binary palindrome algorithm, or the like in a conventional technology. This is not limited in this disclosure.

Optionally, the second information further includes at least one of the following: the identifier of the first task, a quantity (Num field) of slots corresponding to the first task, and whether the second information is the last piece of response information (LE field) corresponding to the first task.

After receiving the first information from the first node, the second node determines a quantity of slots required by the first service, and the second node determines, based on a case and a capability of the second node, whether to accept the request in the first information.

For example, the second information is shown in FIG. 23. An operation type field indicates "0100", indicating that the second information is acknowledgement response information. A service identifier field indicates a service 308. A slot identifier field indicates a slot 291, indicating that the second node configures the slot 291 for the service 308, that is, establishes a correspondence between the service 308 and the slot 291. An SEQ field indicates "010", indicating that the identifier of the first task (namely, the process of changing the slot corresponding to the first service) is 2. A Num field indicates "110000", indicating that the quantity of the slots corresponding to the first task is 3, that is, the second node indicates, by using the response information, the three slots corresponding to the first service. An LE field indicates "0", indicating that the second information is not the last piece of response information corresponding to the first task. However, this is not limited in this disclosure.

In an implementation, the last piece of response information corresponding to the first task is response information that is of the last slot corresponding to the first service and that is used by the second node to notify the first node.

For example, the first information is used to notify the second node that the first service corresponds to three slots, the second node needs to send three pieces of response information to separately configure the three slots corresponding to the first service, and an LE field in each of the first two pieces of response information indicates "0", indicating that the response information is not the last of the three pieces of response information corresponding to the first task. In the third piece of response information, an LE field indicates "1", indicating that the response information is the last of the three pieces of response information corresponding to the first task, as shown in (a) in FIG. 24. However, this is not limited in this disclosure.

In another implementation, the last piece of response information corresponding to the first task includes second check information, that is, after the second node sends the response information of the last slot corresponding to the first service, the second node sends the last piece of response information. The response information includes the second check information. The second check information is generated by the second node based on service information that corresponds to a slot in the first channel and that exists after the slot corresponding to the first service is changed.

For example, the first information is used to notify the second node that the first service corresponds to three slots, the second node needs to send four pieces of response information, the first three pieces of response information are separately used to configure the three slots corresponding to the first service, and an LE field in each of the first three pieces of response information indicate "0", indicating that the response information is not the last of the four pieces of response information corresponding to the first task. In the fourth piece of response information, an LE field indicates "1", indicating that the response information is the last of the four pieces of response information corresponding to the first task, and the response information carries the second check information, as shown in (b) in FIG. 24. However, this is not limited in this disclosure.

S2130. The first node sends fourth information to the second node, where the fourth information is used to indicate to apply the changed slot corresponding to the first service.

Correspondingly, the second node receives the fourth information from the first node. After receiving all acknowledgement response information from the second node, the first node determines that the second node accepts the request in the first information. The first node sends the configuration effective information (namely, the fourth information) to the second node, to notify the second node to apply the changed slot corresponding to the first service. For a field in the fourth information and specific application moments of the first node and the second node, refer to the descriptions in FIG. 4. For brevity, details are not described herein again.

S2140. The first node and the second node start to apply the changed slot corresponding to the first service in a second data frame.

After the first node sends the fourth information, and the second node receives the fourth information, the first node and the second node determine the second data frame in which the slot corresponding to the first service starts to be applied, and starts to apply the changed slot corresponding to the first service in the second data frame.

Based on the foregoing solution, in a massive slot scenario, for a scenario in which a service corresponds to a specified slot, the slot corresponding to the service is dynamically adjusted, to implement on-demand dynamic adjustment of a service bandwidth, and improve resource utilization.

Figure 25:
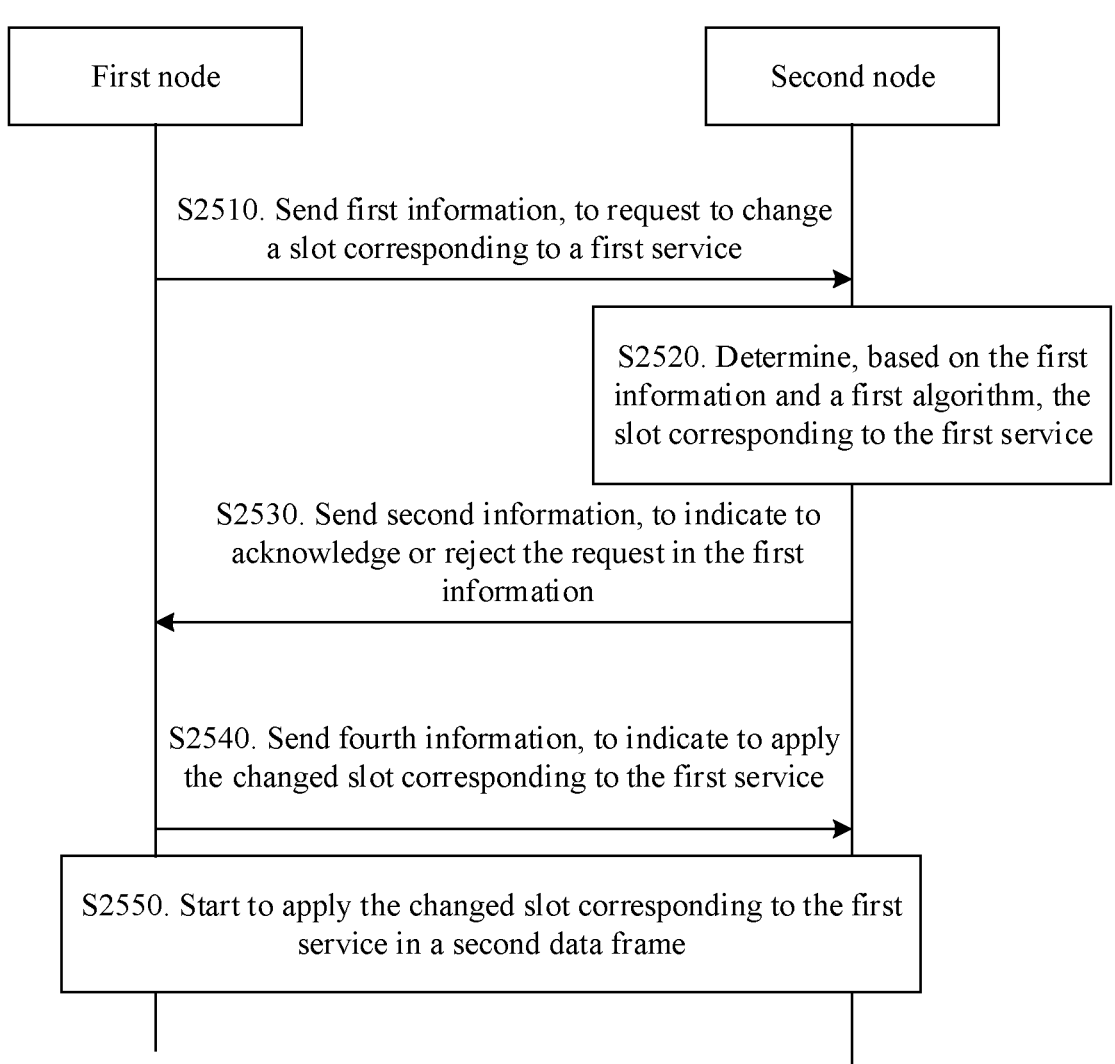
FIG. 25 is another schematic flowchart of a resource configuration method according to an embodiment of this disclosure.

FIG. 25 is another schematic flowchart of a resource configuration method according to an embodiment of this disclosure.

S2510. A first node sends first information to a second node, where the first information is used to indicate to change a slot corresponding to a first service.

Correspondingly, the second node receives the first information from the first node. The first information includes an identifier of the first service and a quantity of slots corresponding to the first service.

For example, in the first information shown in FIG. 26, an operation type field in the first information may indicate a "second value", indicating that a sub-overhead carries request information in a slot configuration process. The first information includes a 12-bit service identifier field and a 12-bit slot quantity field. However, this is not limited in this disclosure.

S2520. The second node determines, based on the first information and a first algorithm, the slot corresponding to the first service.

After the second node receives the first information, the second node determines, based on a case and a capability of the second node, whether to accept the request in the first information. When determining to accept the request in the first information, the second node may obtain, through calculation based on the identifier of the first service, the quantity of slots corresponding to the first service, and the first algorithm, the slot corresponding to the first service, that is, determine an identifier of each slot corresponding to the first service. Both the first node and the second node obtain, through calculation by using the first algorithm, the slot corresponding to the service, so that the two nodes can obtain a same slot through calculation based on the service identifier and the quantity of slots. The first algorithm may be a sigma-delta algorithm, a binary palindrome algorithm, or the like in a conventional technology. This is not limited in this disclosure.

S2530. The second node sends second information to the first node, where the second information is used to indicate acknowledge or reject the request in the first information.

Correspondingly, the first node receives the second information from the second node, to notify the first node whether the second node accepts the request in the first information. When the second node accepts the request in the first information, the second information is acknowledgement response information. When the second node rejects the request in the first information, the second information is rejection response information.

Optionally, the second information includes second check information, and the second check information is generated by the second node based on service information that corresponds to a slot in a first channel and that exists after the slot corresponding to the first service is changed.

For example, in the second information shown in FIG. 26, an operation type field in the second information indicates a "third value", indicating that the second information is acknowledgement response information, or indicates a "fourth value", indicating that the second information is rejection response information. The second information includes 24-bit second check information, so that the first node determines whether slot configurations of the first node and the second node are consistent. However, this is not limited in this disclosure.

S2540. The first node sends fourth information to the second node, where the fourth information is used to indicate to apply the changed slot corresponding to the first service.

Correspondingly, the second node receives the fourth information from the first node. After receiving the acknowledgement response information from the second node, the first node determines that the second node accepts the request in the first information. The first node sends the configuration effective information (namely, the fourth information) to the second node, to notify the second node to apply the changed slot corresponding to the first service. For a field in the fourth information and specific application moments of the first node and the second node, refer to the descriptions in FIG. 4. For brevity, details are not described herein again.

Optionally, the first node may obtain, through calculation based on the identifier of the first service, the quantity of slots corresponding to the first service, and the first algorithm, the slot corresponding to the first service, and generate first check information based on a slot that is in the first channel and that exists after the slot corresponding to the first service is changed. The first node determines, through comparison, whether the first check information is consistent with the second check information, and sends the fourth information when the first check information is consistent with the second check information.

For example, in the fourth information shown in FIG. 26, an operation type field in the fourth information indicates a "fifth value", indicating that the fourth information is configuration effective information. The second information further includes 24-bit first check information. However, this is not limited in this disclosure.

S2550. The first node and the second node start to apply the changed slot corresponding to the first service in a second data frame.

After the first node sends the fourth information, and second node receives the fourth information, the first node and the second node determine the second data frame in which the slot corresponding to the first service starts to be applied, and starts to apply the changed slot corresponding to the first service in the second data frame.

Based on the foregoing solution, in a massive slot scenario, for a scenario in which a service corresponds to a specified slot, the slot corresponding to the service is dynamically adjusted, to implement on-demand dynamic adjustment of a service bandwidth, and improve resource utilization.

Figure 27:
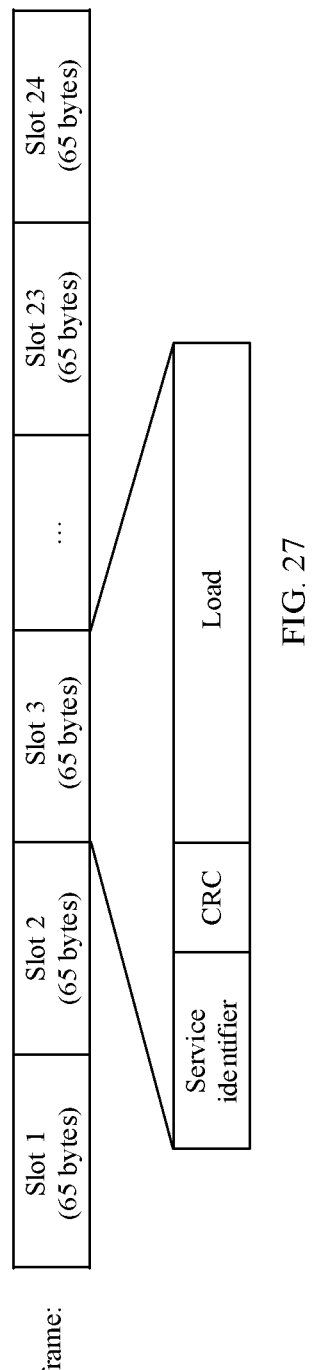
FIG. 27 is a schematic diagram of a slot format in a basic frame according to an embodiment of this disclosure.

An embodiment of this disclosure further provides a resource configuration method. To be specific, when a first node sends a basic frame to a second node, each slot in the basic frame includes a service identifier corresponding to the slot, for example, as shown in FIG. 27. After receiving the basic frame, the second node determines, based on the service identifier included in the slot, a service corresponding to the slot. Optionally, the slot further includes check information of the service identifier, for example, CRC check information. However, this is not limited in this disclosure.

Based on the solution of this disclosure, a slot carries a service identifier. A transmit end may not necessarily perform sending in a fixed slot during sending, and may not depend on a preset slot to distinguish between corresponding services during receiving. This reduces processing complexity of a node. In actual application, after receiving data, the node may continue to forward the data to a downstream node, so that time in which service data stays on the node is not affected by a fixed slot of an upstream channel of the node and a fixed slot of a downstream channel of the node, and a delay can be reduced.

Figure 28:
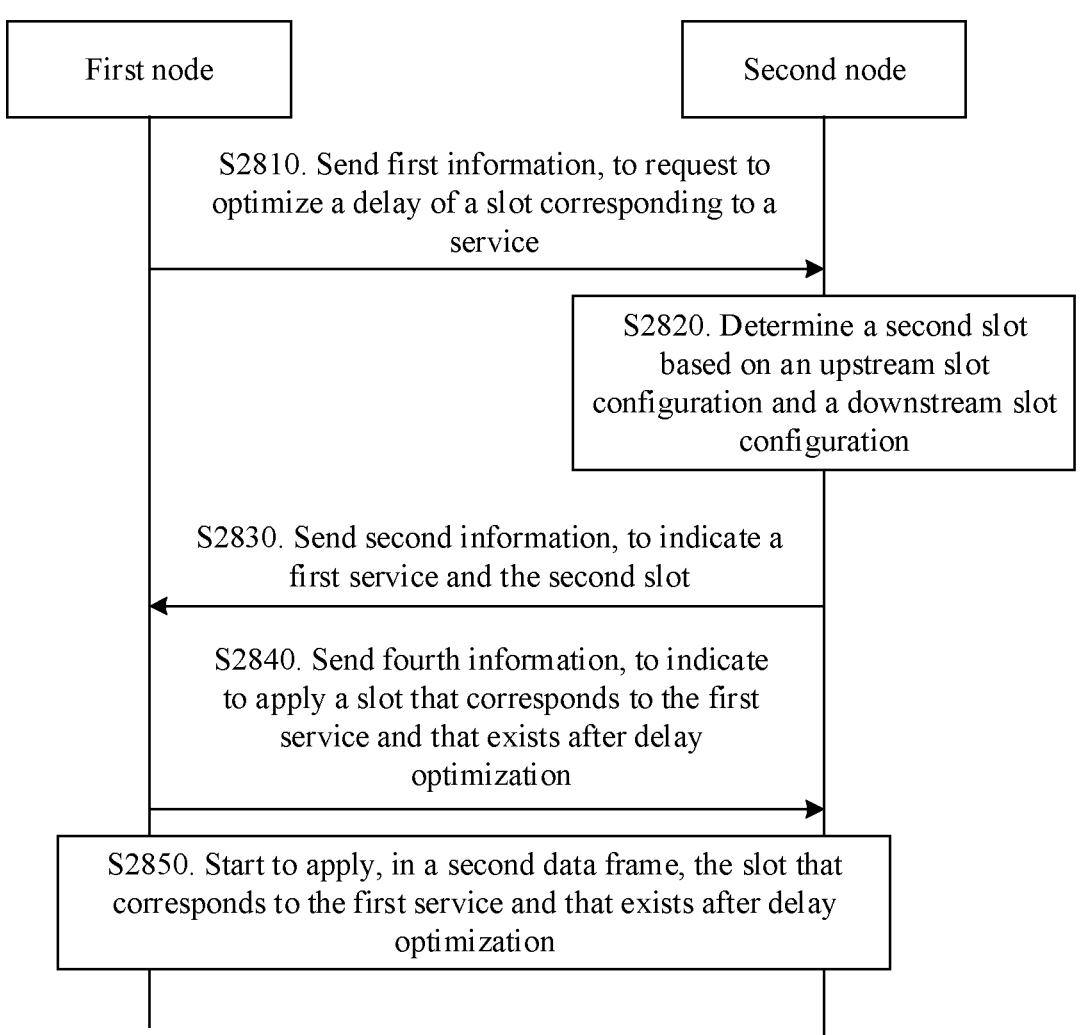
FIG. 28 is another schematic flowchart of a resource configuration method according to an embodiment of this disclosure.

FIG. 28 is another schematic flowchart of a resource configuration method according to an embodiment of this disclosure.

S2810. A first node sends first information to a second node, where the first information is used to request to optimize a delay of a slot corresponding to a service.

Correspondingly, the second node receives the first information from the first node. The first information includes an identifier of a first service and an identifier of a first slot. The first information is used to request to optimize a delay of the first slot corresponding to the first service.

Optionally, the first information may be carried in a sub-overhead in a first basic frame, and the first basic frame is one of basic frames included in a first data frame sent by the first node to the second node.

Optionally, the sub-overhead includes the foregoing information type field and the foregoing operation type field. When the operation type field indicates a seventh value, it indicates that the sub-overhead carries delay optimization request information.

For example, the first information may be shown in (a) in FIG. 29. An information type field indicates "00", indicating that the sub-overhead carries information in a slot configuration process. An operation type field indicates "1111", indicating that the sub-overhead carries delay optimization request information. A service identifier field indicates a service (denoted as a service 4) whose identifier is 4, and a slot identifier field indicates a slot (denoted as a slot 2) whose identifier is "2", indicating that the first information requests to optimize the slot 2 corresponding to the service 4. Optionally, the first information further includes an SEQ field used to indicate an identifier of the delay optimization process (or referred to as a first task). The first information may further include an LE field. The LE field indicates "1", indicating that the service has only one slot. However, this is not limited in this disclosure.

Optionally, the first node may request to optimize a plurality of slots, and the first information may include a Num field used to indicate a quantity of slots that need to be optimized.

For example, as shown in (b) in FIG. 29, in the first information, the Num field indicates to optimize three slots, indicating that the first node needs to send three pieces of optimization request information to the second node, and the LE field indicates "0", indicating that the first information is not the last piece of optimization request information, that is, the first information is the first or second piece of optimization request information. When the first node sends the third piece of optimization request information, an LE field in the third piece of optimization request information indicates "1". However, this is not limited in this disclosure.

S2820. The second node determines a second slot based on an upstream slot configuration and a downstream slot configuration.

After receiving the first information, the second node determines, based on the upstream slot configuration (namely, a configuration of a slot in a first channel in a transmission direction from the first node to the second node) and the downstream slot allocation (namely, a configuration of a slot in a channel in a transmission direction from the second node to a downstream node), the second slot whose delay is less than that of the first slot.

S2830. The second node sends second information to the first node, where the second information is used to indicate the first service and the second slot.

Correspondingly, the first node receives the second information from the second node. The second node sends the second information to the first node, to respond to the request in the first information. The second information includes the identifier of the first service and an identifier of the second slot, indicating to release, after delay optimization, a correspondence between the first service and the first slot that are indicated in the first information, and establish a correspondence between the first service and the second slot.

Optionally, the second information may be carried in a sub-overhead in a basic frame sent by the second node to the first node.

For example, the second information may be shown in (a) in FIG. 30. An information type field indicates "00", indicating that the sub-overhead carries information in a slot configuration process. When an operation type field indicates an eighth value, for example, when the eighth value is "1110", it indicates that the sub-overhead carries delay optimization response information. A service identifier field indicates a service 4, and a slot identifier field indicates a slot 5, indicating that the second information indicates that the service 4 corresponds to the slot 5 after optimization, that is, after a correspondence between the service 4 and the first slot is released. The second information further includes an SEQ field used to indicate an identifier of the delay optimization process (or referred to as the first task), and an LE field that indicates "1", indicating that the service has only one slot. However, this is not limited in this disclosure.

Optionally, when the first node requests to optimize a plurality of slots, the second information may include a Num field used to indicate a quantity of slots that need to be optimized.

For example, as shown in (b) in FIG. 30, in the second information, the Num field indicates to optimize three slots, indicating that the first node requests to optimize three slots, and/or the second node needs to send three pieces of response information, and the LE field indicates "0", indicating that the second information is not the last piece of response information, that is, the second information is the first or second piece of optimization response information. When the first node sends the third piece of optimization response information, an LE field in the third piece of optimization response information indicates "1". However, this is not limited in this disclosure.

Optionally, when the first node requests to optimize a plurality of slots, after the first node sends one piece of request information (denoted as REQ information), the second node sends response information (denoted as ACK information), and the first node sends a next piece of request information. After the first node receives the last piece of response information (that is, receives response information whose LE field indicates "1") from the second node, the first node performs S2840.

Figure 31:
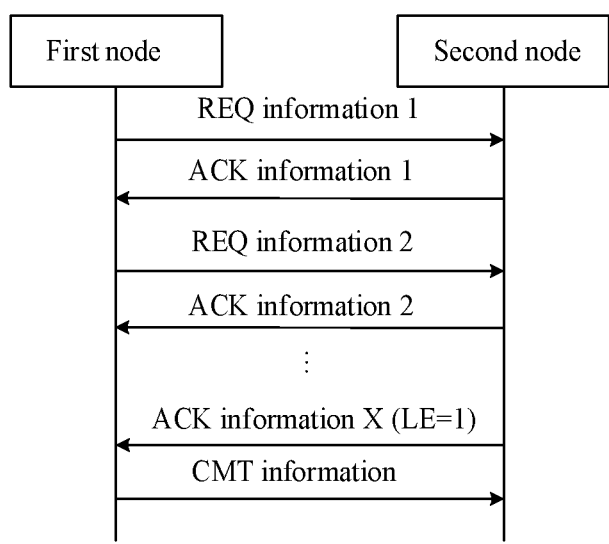
FIG. 31 is another schematic flowchart of a resource configuration method according to an embodiment of this disclosure.

For example, as shown in FIG. 31, the first node requests to optimize X slots corresponding to the first service. The first node sends REQ information 1 to the second node, to request to optimize a slot 1 corresponding to the first service. The second node determines, based on the upstream slot configuration and the downstream slot configuration, a slot whose delay is less than that of the slot 1, and sends ACK information 1 to indicate a slot that corresponds to the first service and that exists after optimization. After receiving the ACK information 1 corresponding to the REQ information 1, the first node sends REQ information 2 to the second node, and after receiving ACK information 2, sends a next piece of REQ information until the first node receives ACK information X whose LE field indicates "1". In this case, the first node sends CMT information to the second node to indicate to enable optimization to take effect. However, this is not limited in this disclosure.

S2840. The first node sends fourth information to the second node, where the fourth information is used to indicate to apply a slot that corresponds to the first service and that exists after delay optimization.

Correspondingly, the second node receives the fourth information from the first node.

Optionally, the fourth information is carried in an overhead in a third data frame sent by the first node to the second node.

The first node and the second node start to apply, in a second data frame, the slot that corresponds to the first service and that exists after delay optimization. For an indication manner of the fourth information (namely, configuration effective information), refer to the descriptions in the embodiment in FIG. 4. For brevity, details are not described herein again.

After the second node receives the fourth information and determines to start to apply, in the second data frame, the slot that corresponds to the first service and that exists after delay optimization, in S2850, the first node and the second node start to apply, in the second data frame, the slot that corresponds to the first service and that exists after delay optimization.

The method shown in the embodiment in FIG. 28 may be applied to the system shown in FIG. 1 to optimize the delay of the first service between the E1 and the E2 (end-to-end), to reduce an end-to-end delay of the first service. When the end-to-end delay is optimized, the delay optimization process of the first service between two adjacent nodes may be first completed, and then the delay optimization process between one of the two adjacent nodes and a next adjacent node is started. After the delay optimization process between every two adjacent nodes in the system is completed, delay optimization of the first service in the system is completed. However, this is not limited in this disclosure.

Optionally, a service delay optimization process between nodes or an end-to-end service delay optimization process may be periodically executed.

Based on the foregoing solution, service delay optimization can be implemented, and a case in which a service delay is increased due to internal processing, a frequency deviation, and the like of a node can be reduced.

The method provided in embodiments of this disclosure is described in detail above with reference to FIG. 4 to FIG. 31.

The following describes in detail an apparatus provided in embodiments of this disclosure.

Figure 32:
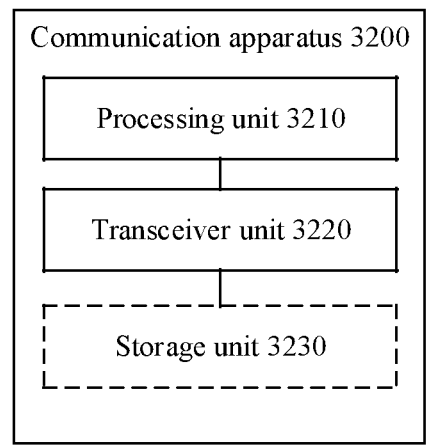
FIG. 32 is a schematic block diagram of a communication apparatus according to this disclosure.

FIG. 32 is a schematic block diagram of a communication apparatus according to an embodiment of this disclosure. As shown in FIG. 32, a communication apparatus 3200 may include a processing unit 3220 and a transceiver unit 3210.

In a possible design, the communication apparatus 3200 may correspond to the first node in the foregoing method embodiment, or a chip configured in (or used in) the first node.

It should be understood that the communication apparatus 3200 may include units corresponding to steps performed by the first node in the methods 400, 1400, 2000, 2100, 2500, and 2800 in FIG. 4, FIG. 14, FIG. 20A to FIG. 20C, FIG. 21, FIG. 25, and FIG. 28. In addition, the units in the communication apparatus 3200 and the foregoing other operations and/or functions are respectively intended to implement corresponding procedures in the methods 400, 1400, 2000, 2100, 2500, and 2800.

Optionally, the communication apparatus 3200 may further include a processing unit 3210, and the processing unit 3210 may be configured to process instructions or data, to implement a corresponding operation.

Optionally, the communication apparatus 3200 may further include a storage unit. The storage unit may be configured to store instructions or data. The processing unit 3210 may execute the instructions or data stored in the storage unit, so that the communication apparatus implements a corresponding operation.

It should be understood that a specific process in which the units perform the foregoing corresponding steps has been described in detail in the foregoing method embodiments. For brevity, details are not described herein again.

It should be further understood that, when the communication apparatus 3200 is the chip configured in (or used in) the first node, the transceiver unit 3220 in the communication apparatus 3200 may be an input/output interface or circuit of the chip, and the processing unit 3210 in the communication apparatus 3200 may be a processor in the chip.

Figure 33:
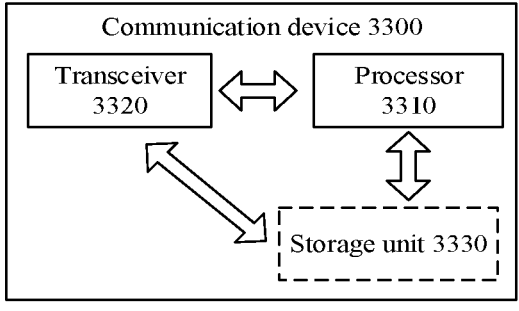
FIG. 33 is a schematic diagram of a structure of a communication device according to this disclosure.

It should be further understood that, when the communication apparatus 3200 is the first node, the transceiver unit 3220 in the communication apparatus 3200 may be implemented by using a communication interface (for example, a transceiver or an input/output interface), for example, may correspond to a transceiver 3320 in a communication device 3300 shown in FIG. 33, the processing unit 3210 in the communication apparatus 3200 may be implemented by using at least one processor, for example, may correspond to a processor 3310 in the communication device 3300 shown in FIG. 33, and the processing unit 3210 in the communication apparatus 3200 may be implemented by using at least one logic circuit.

In another possible design, the communication apparatus 3200 may correspond to the second node in the foregoing method embodiment, for example, or a chip configured in (or used in) the second node.

It should be understood that the communication apparatus 3200 may include units corresponding to steps performed by the second node in the methods 400, 1400, 2000, 2100, 2500, and 2800 in FIG. 4, FIG. 14, FIG. 20A to FIG. 20C, FIG. 21, FIG. 25, and FIG. 28. In addition, the units in the communication apparatus 3200 and the foregoing other operations and/or functions are respectively intended to implement corresponding procedures in the methods 400, 1400, 2000, 2100, 2500, and 2800.

Optionally, the communication apparatus 3200 may further include a processing unit 3210, and the processing unit 3210 may be configured to process instructions or data, to implement a corresponding operation.

Optionally, the communication apparatus 3200 may further include a storage unit. The storage unit may be configured to store instructions or data. The processing unit 3210 may execute the instructions or data stored in the storage unit, so that the communication apparatus implements a corresponding operation.

It should be understood that a specific process in which the units perform the foregoing corresponding steps has been described in detail in the foregoing method embodiments. For brevity, details are not described herein again.

It should be further understood that, when the communication apparatus 3200 is the chip configured in (or used in) the second node, the transceiver unit 3220 in the communication apparatus 3200 may be an input/output interface or circuit of the chip, and the processing unit 3210 in the communication apparatus 3200 may be a processor in the chip.

It should be further understood that, when the communication apparatus 3200 is the second node, the transceiver unit 3220 in the communication apparatus 3200 may be implemented by using a communication interface (for example, a transceiver or an input/output interface), for example, may correspond to a transceiver 3320 in a communication device 3300 shown in FIG. 33, the processing unit 3210 in the communication apparatus 3200 may be implemented by using at least one processor, for example, may correspond to a processor 3310 in the communication device 3300 shown in FIG. 33, and the processing unit 3210 in the communication apparatus 3200 may be implemented by using at least one logic circuit.

FIG. 33 is a schematic diagram of a structure of a communication device 3300 according to an embodiment of this disclosure. The communication device 3300 may be applied to the system shown in FIG. 1 to perform a function of the first node or the second node in the foregoing method embodiments. As shown in the figure, the communication device 3300 includes a processor 3310 and a transceiver 3320. Optionally, the communication device 3300 further includes a memory 3330. The processor 3310, the transceiver 3320, and the memory 3330 may communicate with each other by using an internal connection path to transmit a control signal and/or a data signal. The memory is configured to store a computer program. The processor 3320 is configured to execute the computer program in the memory, to control the transceiver 3310 to send/receive a signal.

The processor 3310 and the memory 3330 may be combined into one processing apparatus. The processor 3320 is configured to execute program code stored in the memory 3330 to implement the foregoing function. In specific implementation, the memory may be integrated into the processor 3320, or is independent of the processor 3320.

The transceiver 3320 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the communication device 3300 shown in FIG. 33 can implement processes related to the first node or the second node in the foregoing method embodiments, for example, implement the operation and/or the function of the first node in the methods 400, 1400, 2000, 2100, 2500, and 2800 in FIG. 4, FIG. 14, FIG. 20A to FIG. 20C, FIG. 21, FIG. 25, and FIG. 28. For details, refer to the descriptions in the foregoing method embodiments. To avoid repetition, detailed descriptions are appropriately omitted herein.

An embodiment of this disclosure further provides a processing apparatus, including a processor and an interface. The processor is configured to perform the method in any one of the foregoing method embodiments. It should be understood that the processing apparatus may be one or more chips.

In an implementation process, the steps in the foregoing methods can be implemented by using a hardware integrated logic circuit in the processor, or by using instructions in a form of software.

Based on the method provided in embodiments of this disclosure, this disclosure further provides a computer program product. The computer program product includes computer program code. When the computer program code is executed by one or more processors, an apparatus including the processor is enabled to perform the method in the foregoing embodiments of this disclosure.

Based on the method provided in embodiments of this disclosure, this disclosure further provides a computer-readable storage medium. The computer-readable storage medium stores program code. When the program code is run by one or more processors, an apparatus including the processor is enabled to perform the method in the foregoing embodiments of this disclosure.

Based on the method provided in embodiments of this disclosure, this disclosure further provides a system, including the foregoing one or more first nodes and the foregoing one or more second nodes.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this disclosure, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A communication method implemented by a first node, wherein the communication method comprises:
   sending first information to a second node, wherein the first node communicates with the second node by using a first channel, wherein the first channel comprises a data frame, wherein the data frame comprises an overhead and a payload, wherein the payload comprises N slots, wherein the data frame comprises M basic frames, wherein each of the M basic frames comprises a sub-overhead and a sub-payload, wherein the sub-payload comprises L slots, wherein the N slots are a set of sub-payloads in the M basic frames, and wherein the first information comprises a request to change a first correspondence between a first slot in the first channel and a first service, a first identifier of the first service, and a second identifier of the first slot; and
   receiving, in response to sending the first information, second information from the second node,
   wherein the second information indicates acknowledgment or rejection of the request.

2. The communication method of claim 1, wherein the first information further comprises a third identifier of a first task, wherein the first task changes a second correspondence between at least one of the N slots and a second service, and wherein the first information is a piece of request information corresponding to the first task.

3. The communication method of claim 2, wherein the first information comprises a second field indicating whether the first information is a last piece of request information corresponding to the first task.

4. The communication method of claim 2, wherein the first information or the second information further comprises a quantity of correspondences that are between the at least one of the N slots and the second service and that are to be changed in the first task.

5. The communication method of claim 1, wherein the second information further comprises the first identifier or the second identifier.

6. The communication method of claim 1, wherein the second information comprises second check information from the second node.

7. The communication method of claim 1, wherein the first information is carried in a sub-overhead in a first basic frame in a first data frame, wherein the first slot is of a sub-payload in a second basic frame, wherein the second basic frame is in a second data frame, wherein the second data frame is later than the first data frame, and wherein a location of the first basic frame in the first data frame is different from a location of the second basic frame in the second data frame.

8. The communication method of claim 1, further comprising sending, by the first node, fourth information to the second node, wherein the fourth information indicates to apply the change to the first correspondence.

9. A communication method implemented by a second node, wherein the communication method comprises:
   receiving first information from a first node, wherein the second node communicates with the first node by using a first channel, wherein the first channel comprises a data frame, wherein the data frame comprises an overhead and a payload, wherein the payload comprises N slots, wherein the data frame comprises M basic frames, wherein each of the M basic frames comprises a sub-overhead and a sub-payload, wherein the sub-payload comprises L slots, wherein the N slots are a set of sub-payloads in the M basic frames, and wherein the first information comprises a request to change a first correspondence between a first slot in the first channel and a first service, a first identifier of the first service, and a second identifier of the first slot; and sending, in response to receiving the first information, second information to the first node, wherein the second information indicates acknowledgment or rejection of the request.

10. The communication method of claim 9, wherein the first information further comprises a third identifier of a first task, wherein the first task changes a second correspondence between at least one of the N slots and a second service, and wherein the first information is a piece of request information corresponding to the first task.

11. The communication method of claim 10, wherein the first information comprises a second field indicating whether the first information is a last piece of request information corresponding to the first task.

12. The method to claim 10, wherein the first information or the second information further comprises a quantity of correspondences that are between the at least one of the N slots and the second service and that are to be changed in the first task.

13. The communication method of claim 9, wherein the second information further comprises the first identifier or the second identifier.

14. The communication method of claim 9, wherein the second information comprises second check information, and wherein the communication method further comprises generating, based on service information that corresponds to a second slot in the first channel and that exists after the first correspondence is changed, the second check information.

15. A device, comprising:

a memory configured to store instructions; and a processor coupled to the memory and configured to execute the instructions to:

send first information to a second node, wherein the device communicates with the second node by using a first channel, wherein the first channel comprises a data frame, wherein the data frame comprises an overhead and a payload, wherein the payload comprises N slots, wherein the data frame comprises M basic frames, wherein each of the M basic frames comprises a sub-overhead and a sub-payload, wherein the sub-payload comprises L slots, wherein the N slots are a set of sub-payloads in the M basic frames, and wherein the first information comprises a request to change a first correspondence between a first slot in the first channel and a first service, a first identifier of the first service, and a second identifier of the first slot; and receive, in response to sending the first information, second information from the second node, wherein the second information indicates acknowledgment or rejection of the request.

16. The device of claim 15, wherein the first information further comprises a third identifier of a first task, wherein the first task changes a second correspondence between at least one slot of the N slots and a second service, and wherein the first information is a piece of request information corresponding to the first task.

17. The device of claim 16, wherein the first information comprises a second field indicating whether the first information is a last piece of request information corresponding to the first task.

18. The device of claim 16, wherein the first information further comprises a quantity of correspondences that are between the at least one of the N slots and the second service and that are to be changed in the first task.

19. The device of claim 16, wherein the second information comprises a quantity of correspondences that are between the at least one of the N slots and the second service and that are to be changed in the first task.

20. The device of claim 15, wherein the second information further comprises the first identifier.

* * * * *